US008854343B2

(12) United States Patent
Kishi

(10) Patent No.: US 8,854,343 B2
(45) Date of Patent: Oct. 7, 2014

(54) DISPLAY DEVICE AND METHOD FOR DRIVING THE SAME

(75) Inventor: Noritaka Kishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 220 days.

(21) Appl. No.: 12/737,680

(22) PCT Filed: Jun. 2, 2009

(86) PCT No.: PCT/JP2009/060034

§ 371 (c)(1),
(2), (4) Date: Feb. 4, 2011

(87) PCT Pub. No.: WO2010/029795

PCT Pub. Date: Mar. 18, 2010

(65) Prior Publication Data

US 2011/0141084 A1 Jun. 16, 2011

(30) Foreign Application Priority Data

Sep. 10, 2008 (JP) ................................ 2008-231807

(51) Int. Cl.

*G06F 3/038* (2013.01)
*G09G 5/00* (2006.01)
*G09G 3/30* (2006.01)
*G09G 3/32* (2006.01)
*G09G 3/20* (2006.01)

(52) U.S. Cl.

CPC ...... *G09G 3/3291* (2013.01); *G09G 2310/0251* (2013.01); *G09G 2300/0861* (2013.01); *G09G 2330/021* (2013.01); *G09G 2300/0819* (2013.01); *G09G 2320/0242* (2013.01); *G09G 2300/0842* (2013.01); *G09G 2330/028* (2013.01); *G09G 2310/0248* (2013.01); *G09G 3/2003* (2013.01); *G09G 2320/029* (2013.01); *G09G 2320/02* (2013.01); *G09G 2330/02* (2013.01)

USPC ................ 345/204; 345/211; 345/76; 345/83

(58) Field of Classification Search

USPC ........ 345/87–104, 76–83, 204–215, 690–699
See application file for complete search history.

(56) References Cited

U.S. PATENT DOCUMENTS 6,177,914 B1 1/2001 Iwama et al.
6,583,577 B1 6/2003 Choi et al.

(Continued)

FOREIGN PATENT DOCUMENTS

JP 10-198322 7/1998
JP 2004170787 A 6/2004

(Continued)

OTHER PUBLICATIONS

International Search Report.

(Continued)

*Primary Examiner* — Amr Awad
*Assistant Examiner* — Roberto Flores
(74) *Attorney, Agent, or Firm* — Harness, Dickey & Pierce, P.L.C.

(57) ABSTRACT

A pixel circuit includes an organic EL element, a driving, and a switching provided between the gate and drain of the driving. Upon writing into the pixel circuit, an initial voltage is applied to the gate terminal of the driving, and the switching is temporarily controlled to a conducting state while the driving is in a conducting state, and a data voltage corrected using a gate terminal potential of the driving obtained at that time is applied to the gate terminal of the driving. In at least one embodiment, the human is sensitive to blue chromaticity differences but is insensitive to green chromaticity differences. An initial voltage that increases the accuracy of threshold correction is used for blue pixel circuits, and an initial voltage that reduces power consumption is used for green pixel circuits. By this, a current-driven type color display device with high image quality and low power consumption is provided.

4 Claims, 16 Drawing Sheets

(56) References Cited

U.S. PATENT DOCUMENTS

| | | | | |
|---|---|---|---|---|
| 7,460,093 | B2 * | 12/2008 | Ozawa et al. | 345/76 |
| 7,884,786 | B2 * | 2/2011 | Kim et al. | 345/83 |
| 2004/0070557 | A1 * | 4/2004 | Asano et al. | 345/76 |
| 2004/0104870 | A1 * | 6/2004 | Mametsuka | 345/76 |
| 2004/0189615 | A1 * | 9/2004 | Osame et al. | 345/173 |
| 2005/0104818 | A1 * | 5/2005 | Kwak et al. | 345/76 |
| 2005/0156829 | A1 * | 7/2005 | Choi et al. | 345/76 |
| 2005/0237273 | A1 | 10/2005 | Ozawa et al. | |
| 2005/0237283 | A1 | 10/2005 | Ozawa et al. | |
| 2006/0139255 | A1 * | 6/2006 | Kim et al. | 345/76 |
| 2006/0164359 | A1 * | 7/2006 | Kimura | 345/92 |
| 2006/0262130 | A1 * | 11/2006 | Kim et al. | 345/589 |
| 2007/0103406 | A1 * | 5/2007 | Kim | 345/76 |
| 2007/0124633 | A1 | 5/2007 | Kim | |
| 2007/0132677 | A1 * | 6/2007 | Osame et al. | 345/82 |
| 2008/0143651 | A1 * | 6/2008 | Choi et al. | 345/76 |
| 2008/0170010 | A1 * | 7/2008 | Kim | 345/76 |
| 2009/0309818 | A1 * | 12/2009 | Kim | 345/77 |
| 2010/0045646 | A1 | 2/2010 | Kishi | |

FOREIGN PATENT DOCUMENTS

| | | | |
|---|---|---|---|
| JP | 2005309150 | A | 11/2005 |
| JP | 2005309151 | A | 11/2005 |
| JP | 2005352411 | A | 12/2005 |
| JP | 2007-133369 | A | 5/2007 |
| JP | 2007133354 | A | 5/2007 |
| JP | 2007199347 | A | 8/2007 |
| WO | WO 03/077229 | | 9/2003 |
| WO | WO-2008108024 | A1 | 9/2008 |

OTHER PUBLICATIONS

Paynton, C. , “Luminance,” *Luminance and Lightness*, XP-002644374.

* cited by examiner

Conventional Art

Conventional Art

DISPLAY DEVICE AND METHOD FOR DRIVING THE SAME

TECHNICAL FIELD

The present invention relates to a display device, and more particularly, to a display device with current drive elements such as an organic EL display or an FED, and a method for driving the display device.

BACKGROUND ART

In recent years, there has been an increasing demand for thin, lightweight, and fast response display devices. Correspondingly, research and development for organic EL (Electro Luminescence) displays and FEDs (Field Emission Displays) have been actively conducted.

Organic EL elements included in an organic EL display emit light at higher luminance with a higher voltage applied thereto and a larger amount of current flowing therethrough. However, the relationship between the luminance and voltage of the organic EL elements easily fluctuates by the influence of drive time, ambient temperature, etc. Due to this, when a voltage-control type drive scheme is applied to the organic EL display, it is very difficult to suppress variations in the luminance of the organic EL elements. In contrast to this, the luminance of the organic EL elements is substantially proportional to current, and this proportional relationship is less susceptible to external factors such as ambient temperature. Therefore, it is desirable to apply a current-control type drive scheme to the organic EL display.

Meanwhile, pixel circuits and drive circuits of a display device are formed using TFTs (Thin Film Transistors) composed of amorphous silicon, low-temperature polycrystal silicon, CG (Continuous Grain) silicon, etc. However, variations are likely to occur in TFT characteristics (e.g., threshold voltage and mobility). Hence, a circuit that compensates for variations in TFT characteristics is provided in a pixel circuit of an organic EL display. By the action of this circuit, variations in the luminance of an organic EL element are suppressed.

Schemes to compensate for variations in TFT characteristics in the current-control type drive scheme are broadly classified into a current program scheme that controls the amount of current flowing through a driving TFT by a current signal; and a voltage program scheme that controls such an amount of current by a voltage signal. By using the current program scheme, variations in threshold voltage and mobility can be compensated for, and by using the voltage program scheme, only variations in threshold voltage can be compensated for.

The current program scheme, however, has the following problems. First, since a very small amount of current is handled, it is difficult to design pixel circuits and drive circuits. Second, since the influence of parasitic capacitance is likely to be received while a current signal is set, it is difficult to achieve an increase in area. On the other hand, in the voltage program scheme, the influence of parasitic capacitance, etc., is very small and a circuit design is relatively easy. In addition, the influence of variations in mobility exerted on the amount of current is smaller than the influence of variations in threshold voltage exerted on the amount of current, and the variations in mobility can be suppressed to a certain extent in a TFT fabrication process. Therefore, even with a display device to which the voltage program scheme is applied, sufficient display quality can be obtained.

For an organic EL display to which the current-control type drive scheme is applied, pixel circuits shown below are conventionally known. FIG. 14 is a circuit diagram of a pixel circuit and an output switch described in Patent Document 1. In FIG. 14, a pixel circuit 120 includes transistors T1 to T4, an organic EL element OLED, and a capacitor Cs, and an output switch 121 includes transistors T5 to T8 and a capacitor C1. The pixel circuit 120 is connected to a power supply wiring line Vp, a common cathode Vcom, scanning lines G1*i* and G2*i*, and a data line Sj. A voltage V0, a data voltage Vdata, a threshold correction voltage Vpre, and a voltage Va are applied to one ends of the transistors T5 to T8, respectively. The voltage Va is a voltage close to a threshold voltage of the transistor T3.

The pixel circuit 120 operates according to a timing chart shown in FIG. 15. As shown in FIG. 15, during the first half of a threshold voltage write period, the transistors T1, T2, T5, and T7 are placed in a conducting state and the transistors T4, T6, and T8 are placed in a non-conducting state. At this time, a threshold correction voltage Vpre is applied to the data line Sj, and the same voltage is also applied to the gate and drain terminals of the transistor T3. During the second half of the threshold voltage write period, the transistor T7 is placed in a non-conducting state. At this time, charges accumulated in the capacitor Cs are discharged through the transistors T1 to T3 and thus the gate terminal potential of the transistor T3 rises to a level Vt according to the threshold voltage of the transistor T3. In addition, during the second half of the threshold voltage write period, the transistor T8 is placed in a conducting state for a predetermined period of time. By this, a voltage Va for charging a stray capacitance Cf is applied to the data line Sj and thus the gate terminal potential of the transistor T3 reaches Vt in a short time.

During a display data voltage write period, the transistors T2 and T6 are placed in a conducting state and the transistors T1, T4, T5, T7, and T8 are placed in a non-conducting state. The inter-electrode voltage of the capacitor C1 does not change upon transitioning from the threshold voltage write period to the display data voltage write period. Therefore, when the potential of one electrode of the capacitor C1 (electrode connected to the transistors T5 and T6) is changed from V0 to Vdata, the potential of the other electrode of the capacitor C1 also changes by the same amount. A potential (Vt+Vdata−V0) obtained thereby is applied to the gate terminal of the transistor T3 through the transistor T2.

During a light-emission period, the transistor T4 is placed in a conducting state and the transistors T1, T2, and T5 to T7 are placed in a non-conducting state. The capacitor Cs holds a gate-source voltage of the transistor T3 upon transitioning from the display data voltage write period to the light-emission period. Hence, during the light-emission period, the gate terminal potential of the transistor T3 remains at (Vt+Vdata−V0). The amount of current flowing through the transistor T3 is determined by the gate-source voltage thereof, and the organic EL element OLED emits light at a luminance according to the amount of current flowing through the transistor T3. Since the amount of current flowing through the transistor T3 does not depend on the threshold voltage of the transistor T3, the organic EL element OLED emits light at a luminance that does not depend on the threshold voltage of the transistor T3.

As such, by driving the pixel circuit 120 by the method shown in FIG. 15, without providing a threshold correction capacitor in the pixel circuit 120, a potential according to the threshold voltage of the transistor T3 is applied to the gate terminal of the transistor T3, and thus, the organic EL element OLED is allowed to emit light at a desired luminance, regardless of the threshold voltage of the transistor T3.

FIG. 16 is a circuit diagram of a pixel circuit described in Patent Document 2. A pixel circuit 130 shown in FIG. 16 includes transistors M1 to M6, an organic EL element OLED, and a capacitor Cst. The pixel circuit 130 is connected to a power supply wiring line Vp, a common cathode Vcom, a precharge line to which an initial voltage Vint is applied, scanning lines GAi and GBi, and a control line Ei and a data line Sj. The pixel circuit 130 operates according to a timing chart shown in FIG. 13 (described later). The operation of the pixel circuit 130 is the same as that of a pixel circuit according to a second embodiment of the present invention and thus description thereof is omitted here. By driving the pixel circuit 130 by the method shown in FIG. 13, a potential according to a threshold voltage of the transistor M1 is applied to a gate terminal of the transistor M1, and thus, the organic EL element OLED is allowed to emit light at a desired luminance, regardless of the threshold voltage of the transistor M1.

Note that, in addition to the examples shown above, an example of the organic EL display is also described in another application (International Patent Application No. PCT/2007/69184, Filing Date: Oct. 1, 2007, Priority Date: Mar. 8, 2007) having a common applicant and a common inventor with the present application.

RELATED DOCUMENTS

Patent Documents

[Patent Document 1] Japanese Laid-Open Patent Publication No. 2005-352411

[Patent Document 2] Japanese Laid-Open Patent Publication No. 2007-133369

SUMMARY OF THE INVENTION

Problems to be Solved by the Invention

Meanwhile, as is conventionally known, color discrimination capability of a human varies from color to color. FIG. 17 is a diagram showing MacAdam's chromatic discrimination thresholds. In FIG. 17, a plurality of ellipses are depicted in xy chromaticity coordinates. Each ellipse represents a range where colors therewithin are determined by the human to have the same chromaticity (note that for easy visualization of the drawing the ellipses are depicted ten times their actual size). The human is sensitive to chromaticity differences near small ellipses and insensitive to chromaticity differences near large ellipses. As can be seen from FIG. 17, of red, green, and blue, the human is most sensitive to blue chromaticity differences, and next most sensitive to red chromaticity differences, and most insensitive to green chromaticity differences.

In the above-described organic EL displays, when threshold correction is performed on a drive element (the transistor T3 in FIG. 14 and the transistor M1 in FIG. 16) that controls the amount of current flowing through an organic EL element, a predetermined initial voltage (Vpre in FIG. 14 and Vint in FIG. 16) is applied to the gate terminal of the drive element. At this time, if such an initial voltage that increases the absolute value of the gate-source voltage of the drive element is applied, then the accuracy of the threshold correction increases and thus image quality improves, but power consumption resulting from charging and discharging of signal lines increases. On the other hand, if such an initial voltage that reduces the absolute value of the gate-source voltage of the drive element is applied, then power consumption decreases but the accuracy of the threshold correction decreases and thus image quality degrades. As such, when determining the initial voltage, image quality and power consumption are in a trade-off relationship.

In a conventional organic EL display that performs color display, one type of initial voltage is used in the entire device, and the initial voltage is determined, for example, with reference to a certain color. When the initial voltage is determined with reference to green, threshold correction can be done with low accuracy, and thus, the absolute value of the gate-source voltage of each drive element decreases, reducing power consumption. However, the accuracy of threshold correction is insufficient for blue and red that are more sensitively discriminable than green. Thus, color variations become noticeable in blue and red, degrading image quality. On the other hand, when the initial voltage is determined with reference to blue, the absolute value of the gate-source voltage of each drive element increases, and thus, threshold correction of the drive elements for all colors can be performed with high accuracy. However, since the same initial voltage used for blue is also used for green and red that are only more insensitively discriminable than blue, power consumption increases more than necessary.

An object of the present invention is therefore to provide a current-driven type color display device with high image quality and low power consumption.

Means for Solving the Problems

According to a first aspect of the present invention, there is provided a current-driven type display device that performs color display including: a plurality of pixel circuits arranged at respective intersections of a plurality of scanning lines and a plurality of data lines, each pixel circuit including an electro-optic element; a drive element that controls an amount of current flowing through the electro-optic element; and a compensation switching element provided between a control terminal and a first conduction terminal of the drive element; and a drive circuit that selects a write-target pixel circuit using a corresponding scanning line, and writes a data voltage into the selected pixel circuit using a corresponding data line, wherein for the selected pixel circuit, the drive circuit performs an operation of providing an initial potential difference between the control terminal and a second conduction terminal of the drive element and temporarily controlling the compensation switching element to a conducting state while the drive element is in a conducting state, and an operation of applying, to the control terminal of the drive element, a data voltage corrected using a control terminal potential of the drive element obtained at the end of a conduction period of the compensation switching element, and the pixel circuits are classified into a plurality of types by display color, and the initial potential difference differs between at least two types of pixel circuits.

According to a second aspect of the present invention, in the first aspect of the present invention, the pixel circuits include at least pixel circuits for red, green, and blue, and the initial potential difference is set such that a current flowing through the compensation switching element during the conduction period of the compensation switching element is smallest in the pixel circuit for green among the three types of pixel circuits.

According to a third aspect of the present invention, in the first aspect of the present invention, the pixel circuits include at least pixel circuits for red, green, and blue, and the initial potential difference is set such that a current flowing through the compensation switching element during the conduction period of the compensation switching element is largest in the pixel circuit for blue among the three types of pixel circuits.

According to a fourth aspect of the present invention, in the first aspect of the present invention, each of the pixel circuits further includes a writing switching element provided between a corresponding data line and the control terminal of the drive element, and the drive circuit controls the writing switching element to a conducting state and applies, to the data line, an initial voltage which differs between at least two types of pixel circuits so as to provide the initial potential difference.

According to a fifth aspect of the present invention, in the fourth aspect of the present invention, the drive circuit includes a capacitor for each of the data lines, and after the end of the conduction period of the compensation switching element, the drive circuit connects a first electrode of the capacitor to the data line with the writing switching element being still controlled to the conducting state, and switches a voltage applied to a second electrode of the capacitor from a reference voltage to the data voltage.

According to a sixth aspect of the present invention, in the fifth aspect of the present invention, the reference voltage differs between at least two types of pixel circuits.

According to a seventh aspect of the present invention, in the first aspect of the present invention, each of the pixel circuits further includes a capacitor having a first electrode connected to the control terminal of the drive element; a writing switching element provided between a second electrode of the capacitor and a corresponding data line; and an initialization switching element that switches whether to apply a predetermined initial voltage to the two electrodes of the capacitor, the drive circuit controls the writing switching element to a conducting state; applies the data voltage to the data line; and controls the initialization switching element to apply the initial voltage to the first electrode of the capacitor and after the end of the conduction period of the compensation switching element, controls the writing switching element to a non-conducting state; and controls the initialization switching element to apply the initial voltage to the second electrode of the capacitor, and the initial voltage differs between at least two types of pixel circuits so as to provide the initial potential difference.

According to an eighth aspect of the present invention, in the first aspect of the present invention, a supply voltage which differs between at least two types of pixel circuits is applied to the second conduction terminal of the drive element so as to provide the initial potential difference.

According to a ninth aspect of the present invention, there is provided a method for driving a display device having a plurality of pixel circuits arranged at respective intersections of a plurality of scanning lines and a plurality of data lines, each pixel circuit including an electro-optic element; a drive element that controls an amount of current flowing through the electro-optic element; and a compensation switching element provided between a control terminal and a first conduction terminal of the drive element, the method including the steps of: selecting a write-target pixel circuit using a corresponding scanning line; for the selected pixel circuit, providing an initial potential difference between the control terminal and a second conduction terminal of the drive element and temporarily controlling the compensation switching element to a conducting state while the drive element is in a conducting state; and for the selected pixel circuit, applying, to the control terminal of the drive element, a data voltage corrected using a control terminal potential of the drive element obtained at the end of a conduction period of the compensation switching element, wherein the pixel circuits are classified into a plurality of types by display color, and the initial potential difference differs between at least two types of pixel circuits.

Effect of the Invention

According to the first or ninth aspect of the present invention, when threshold correction of a drive element is performed, an initial potential difference which differs depending on the display color can be provided between the control terminal and second conduction terminal of the drive element. Hence, for a color (e.g., blue) for which the human is sensitive to chromaticity differences, threshold correction is performed with high accuracy by providing a large initial potential difference, whereby image quality can be improved. On the other hand, for a color (e.g., green) for which the human is insensitive to chromaticity differences, excessive charging and discharging of signal lines are reduced by providing a small initial potential difference, whereby power consumption can be reduced. As such, by switching the initial potential difference provided between the control terminal and second conduction terminal of the drive element, according to the display color, taking into account human visual characteristics, image quality can be improved and power consumption can be reduced.

According to the second aspect of the present invention, the current flowing through the compensation switching element during a conduction period of the compensation switching element is smallest in the green pixel circuit. Thus, when threshold correction of a drive element is performed for green for which the human is insensitive to chromaticity differences, excessive charging and discharging of signal lines are reduced, enabling to reduce power consumption.

According to the third aspect of the present invention, the current flowing through the compensation switching element during a conduction period of the compensation switching element is largest in the blue pixel circuit. Thus, when threshold correction of a drive element is performed for blue for which the human is sensitive to chromaticity differences, the threshold correction is performed with high accuracy, enabling to improve quality.

According to the fourth aspect of the present invention, when threshold correction of the drive element is performed, by controlling the writing switching element to a conducting state and applying, to the data line, an initial voltage which differs between at least two types of pixel circuits, an initial potential difference which differs depending on the display color is provided between the control terminal and second conduction terminal of the drive element, whereby image quality can be improved and power consumption can be reduced.

According to the fifth aspect of the present invention, after the end of the conduction period of the compensation switching element, by applying a control terminal potential of the drive element to the first electrode of the capacitor in the drive circuit, and switching the voltage applied to the second electrode of the capacitor from a reference voltage to a data voltage, a data voltage corrected using the control terminal potential of the drive element obtained at the end of the conduction period of the compensation switching element can be applied to the control terminal of the drive element. Accordingly, without providing a threshold correction capacitor in the pixel circuit, threshold correction of the drive element can be performed.

According to the sixth aspect of the present invention, by using a reference voltage that differs between at least two types of pixel circuits, the zeros of data voltages are allowed to coincide with one another.

According to the seventh aspect of the present invention, by controlling the writing switching element to a conducting state and applying a data voltage to the data line, the data voltage can be applied to the control terminal of the drive element through the data line. In addition, by controlling the initialization switching element to apply an initial voltage in turn to two electrodes of the capacitor in the pixel circuit, a data voltage corrected using a control terminal potential of the drive element obtained at the end of the conduction period of the compensation switching element is applied to the control terminal of the drive element, whereby threshold correction of the drive element can be performed. At this time, by using an initial voltage that differs between at least two types of pixel circuits, an initial potential difference which differs depending on the display color is provided between the control terminal and second conduction terminal of the drive element, whereby image quality can be improved and power consumption can be reduced.

According to the eighth aspect of the present invention, when threshold correction of the drive element is performed, by applying a supply voltage which differs between at least two types of pixel circuits to the second conduction terminal of the drive element, an initial potential difference which differs depending on the display color is provided between the control terminal and second conduction terminal of the drive element, whereby image quality can be improved and power consumption can be reduced.

MODE FOR CARRYING OUT THE INVENTION

Display devices according to embodiments of the present invention will be described with reference to FIGS. 1 to 13. The display devices shown below include pixel circuits, each including an electro-optic element and a plurality of switching elements. The switching elements included in the pixel circuit can be composed of low-temperature polysilicon TFTs, CG silicon TFTs, amorphous silicon TFTs, etc. The configurations and fabrication processes of these TFTs are known and thus description thereof is omitted here. The electro-optic element included in the pixel circuit is an organic EL element. The configuration of the organic EL element is also known and thus description thereof is omitted here. In the following, m is a multiple of 3, n is an integer greater than or equal to 2, i is an integer between 1 and n inclusive, j is an integer between 1 and m inclusive, and k is an integer between 1 and (m/3) inclusive.

FIRST EMBODIMENT

Figure 1:
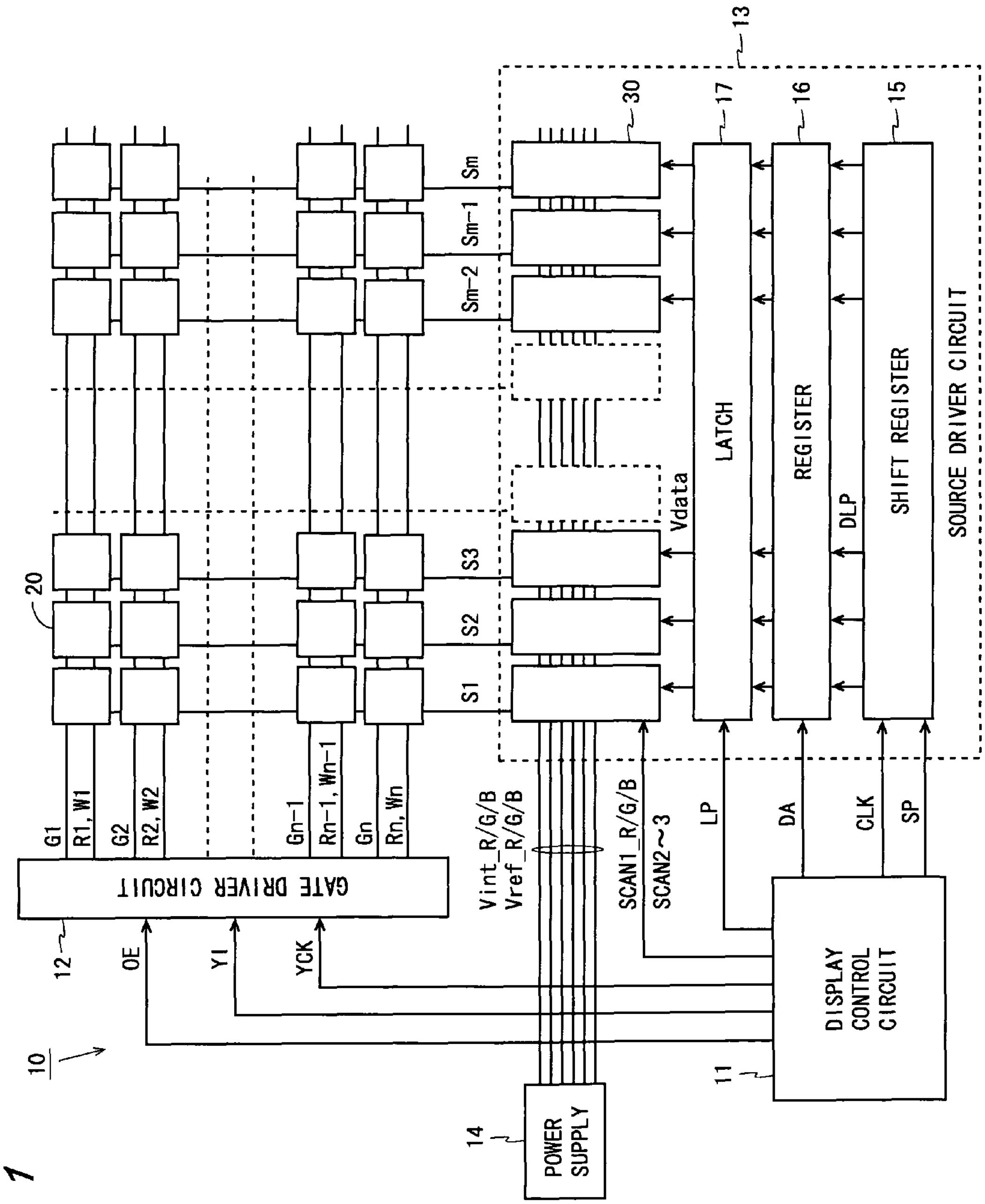
FIG. 1 is a block diagram showing a configuration of a display device according to a first embodiment of the present invention.

FIG. 1 is a block diagram showing a configuration of a display device according to a first embodiment of the present invention. A display device 10 shown in FIG. 1 includes a display control circuit 11, a gate driver circuit 12, a source driver circuit 13, a power supply 14, and (m×n) pixel circuits 20, and performs color display by three RGB colors.

In the display device 10, n scanning lines Gi parallel to one another and m data lines Sj parallel to one another and intersecting perpendicularly with the scanning lines Gi are provided. The pixel circuits 20 are arranged in a matrix form at respective intersections of the scanning lines Gi and the data lines Sj. In addition, n control lines Wi and n control lines Ri which are parallel to one another are arranged parallel to the scanning lines Gi. The scanning lines Gi and the control lines Wi and Ri are connected to the gate driver circuit 12, and the data lines Sj are connected to the source driver circuit 13. Furthermore, in a region where the pixel circuits 20 are arranged, a power supply wiring line Vp and a common cathode Vcom (none of which are shown) are arranged. A direction in which the scanning lines Gi extend (a horizontal direction in FIG. 1) is hereinafter referred to as the row direction, and a direction in which the data lines Sj extend (a vertical direction in FIG. 1) is hereinafter referred to as the column direction.

The pixel circuits 20 are classified into those that display red, those that display green, and those that display blue (hereinafter, referred to as R pixel circuits, G pixel circuits, and B pixel circuits, respectively). In each column of the pixel circuits 20, pixel circuits that display the same color are arranged. Specifically, the R pixel circuits are arranged in a (3k−2) th column, the G pixel circuits are arranged in a (3k−1)th column, and the B pixel circuits are arranged in a 3k-th column. Data lines associated with the pixel circuits in the (3k−2)th to 3k-th columns are hereinafter also referred to as Sk_R, Sk_G, and Sk_B.

The display control circuit 11 outputs a timing signal OE, a start pulse YI, and a clock YCK to the gate driver circuit 12. In addition, the display control circuit 11 outputs a start pulse SP, a clock CLK, a data voltage DA, and a latch pulse LP to the source driver circuit 13. Furthermore, the display control circuit 11 controls the potentials of five control lines SCAN1_R, SCAN1_G, SCAN1_B, SCAN2, and SCAN3 connected to the source driver circuit 13.

The gate driver circuit 12 and the source driver circuit 13 are drive circuits for the pixel circuits 20. The gate driver circuit 12 includes a shift register circuit, a logic operation circuit, and buffers (none of which are shown). The shift register circuit sequentially transfers the start pulse YI in synchronization with the clock YCK. The logic operation circuit performs a logic operation between a pulse outputted from each stage of the shift register circuit and the timing signal OE. An output from the logic operation circuit is provided to a corresponding scanning line Gi and corresponding control lines Wi and Ri through the buffer. To one scanning line Gi are connected m pixel circuits 20, and m pixel circuits 20 are selected at a time using a corresponding scanning line Gi.

The source driver circuit 13 includes an m-bit shift register 15, a register 16, a latch 17, and m output circuits 30, and performs line sequential scanning where voltages are written into pixel circuits 20 of one row at the same timing. More specifically, the shift register 15 has m cascade-connected registers, and transfers the start pulse SP supplied to a register of the first stage, in synchronization with the clock CLK and outputs timing pulses DLP from the registers of the respective stages. An analog data voltage DA is supplied to the register 16 in accordance with output timing of the timing pulses DLP. The register 16 stores the data voltage DA according to the timing pulses DLP. When data voltages DA for one row are stored in the register 16, the display control circuit 11 outputs the latch pulse LP to the latch 17. When the latch 17 receives the latch pulse LP, the latch 17 holds the data voltages stored in the register 16. Note that the data voltage DA is obtained by, for example, converting digital display data to an analog signal in a D/A converter (not shown) provided external to the display device 10.

The output circuits 30 are provided to the respective data lines Sj. The output circuits 30 receive, through the data lines Sj, voltages outputted from pixel circuits 20 which are selected by the gate driver circuit 12, and apply, to the data lines Sj, voltages (hereinafter, referred to as Vdata) based on the received voltages and data voltages outputted from the latch 17. By the action of the output circuits 30, threshold correction of driving TFTs included in the pixel circuits 20 can be performed (details will be described later).

The power supply 14 supplies a supply voltage to each unit of the display device 10. More specifically, the power supply 14 supplies supply voltages VDD and VSS (note that VDD>VSS) to the pixel circuits 20, and supplies initial voltages Vint_R, Vint_G, and Vint_B and reference voltages Vref_R, Vref_G, and Vref_B to the output circuits 30. The initial voltages Vint_R, Vint_G, and Vint_B are voltages applied first to gate terminals of driving TFTs 21 when threshold correction of the driving TFTs 21 is performed. Note that in FIG. 1 wiring lines that connect the power supply 14 to the pixel circuits 20 are omitted.

The source driver circuit 13 may perform, instead of line sequential scanning, dot sequential scanning where voltages are written into the pixel circuits 20 one by one in turn. When dot sequential scanning is performed, while a certain scanning line Gi is selected, the voltage of a corresponding data line Sj is held in a capacitance of the data line Sj. The configuration of a source driver circuit that performs dot sequential scanning is known and thus description thereof is omitted here.

Figure 2:
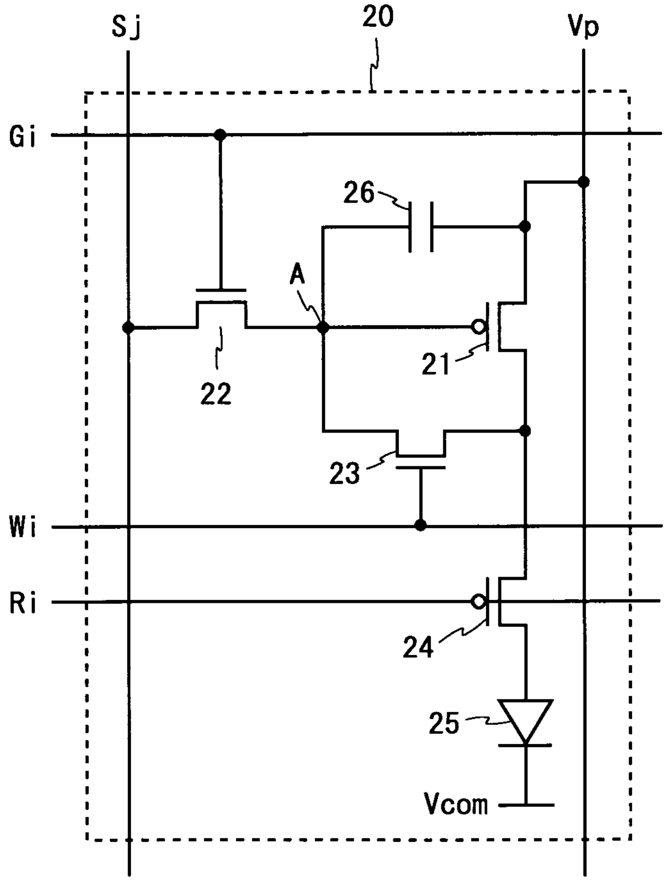
FIG. 2 is a circuit diagram of a pixel circuit included in the display device shown in FIG. 1.

FIG. 2 is a circuit diagram of a pixel circuit 20. As shown in FIG. 2, the pixel circuit 20 includes a driving TFT 21, switching TFTs 22 to 24, an organic EL element 25, and a capacitor 26. The driving TFT 21 is of a P-channel enhancement type, the switching TFTs 22 and 23 are of an N-channel type, and the switching TFT 24 is of a P-channel type. The switching TFT 22 functions as a writing switching element, and the switching TFT 23 functions as a compensation switching element.

The pixel circuit 20 is connected to a power supply wiring line Vp, a common cathode Vcom, a scanning line Gi, control lines Wi and Ri, and a data line Sj. The supply voltage VDD supplied from the power supply 14 is applied to the power supply wiring line Vp, and the supply voltage VSS supplied from the power supply 14 is applied to the common cathode Vcom. The common cathode Vcom is a cathode common to all organic EL elements 25 in the display device 10.

In the pixel circuit 20, between the power supply wiring line Vp and the common cathode Vcom there are provided the driving TFT 21, the switching TFT 24, and the organic EL element 25 in series in this order from the side of the power supply wiring line Vp. The switching TFT 22 is provided between a gate terminal of the driving TFT 21 and the data line Sj. The switching TFT 23 is provided between the gate and drain terminals of the driving TFT 21, and the capacitor 26 is provided between the gate terminal of the driving TFT 21 and the power supply wiring line Vp. Gate terminals of the switching TFTs 22 to 24 are connected to the scanning line Gi, the control line Wi, and the control line Ri, respectively. The potentials of the scanning line Gi and the control lines Wi and Ri are controlled by the gate driver circuit 12, and the potential of the data line Sj is controlled by the source driver circuit 13. A node to which the gate terminal of the driving TFT 21 is connected is hereinafter referred to as A.

Figure 3:
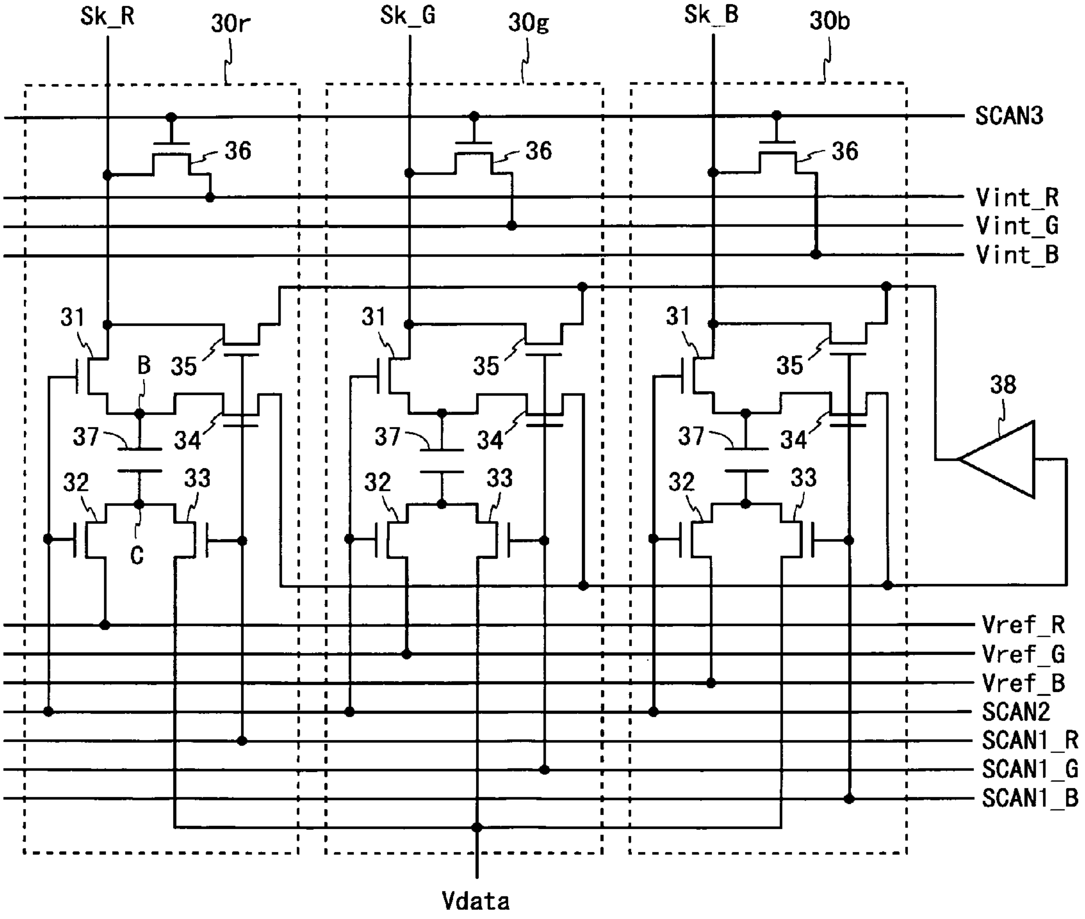
FIG. 3 is a circuit diagram of output circuits included in the display device shown in FIG. 1.

FIG. 3 is a circuit diagram of output circuits 30. The output circuits 30 are classified into those provided for the R pixel circuits, those provided for the G pixel circuits, and those provided for the B pixel circuits (hereinafter, referred to as R output circuits, G output circuits, and B output circuits, respectively). As shown in FIG. 3, each of an R output circuit 30*r*, a G output circuit 30*g*, and a B output circuit 30*b* includes N-channel type switches 31 to 36 and a capacitor 37. One analog buffer 38 is provided for these three output circuits 30. The analog buffer 38 is a voltage follower circuit (unity gain amplifier). A node to which one electrode of the capacitor 37 (the upper electrode in FIG. 3) is connected is hereinafter referred to as B, and a node to which the other electrode is connected is hereinafter referred to as C.

The R output circuit 30*r* has the following configuration. One end of the switch 31 is connected to a data line Sk_R and the other end is connected to the node B. One end of the switch 32 is connected to the node C, and a reference voltage Vref_R is applied to the other end. One end of the switch 33 is connected to the node C, and a data voltage Vdata outputted from the latch 17 is applied to the other end. One end of the switch 34 is connected to the node B and the other end is connected to an input of the analog buffer 38. One end of the switch 35 is connected to the data line Sk_R and the other end is connected to an output of the analog buffer 38. One end of the switch 36 is connected to the data line Sk_R, and an initial voltage Vint_R is applied to the other end. Gate terminals of the switches 31 and 32 are connected to the control line SCAN2, gate terminals of the switches 33 to 35 are connected to the control line SCAN1_R, and a gate terminal of the switch 36 is connected to the control line SCAN3.

The configurations of the G output circuit 30*g* and the B output circuit 30*b* are the same as that of the R output circuit 30*r*. Note, however, that in the G output circuit 30*g*, one end of each of the switches 31, 35, and 36 is connected to a data line Sk_G, an initial voltage Vint_G is applied to the other end of the switch 36, and gate terminals of the switches 33 to 35 are connected to the control line SCAN1_G. In the B output circuit 30*b*, one end of each of the switches 31, 35, and 36 is connected to a data line Sk_B, an initial voltage Vint_B is applied to the other end of the switch 36, and gate terminals of the switches 33 to 35 are connected to the control line SCAN1_B.

The threshold voltages of the driving TFTs 21 provided in the R pixel circuit, the G pixel circuit, and the B pixel circuit are hereinafter referred to as Vth_R, Vth_G, and Vth_B, respectively (note that all of them have negative values). In addition, when a threshold voltage is applied to the gate terminal of the driving TFT 21, the driving TFT 21 is referred to as being in a threshold state. The initial voltage Vint_R and the reference voltage Vref_R are used for threshold correction of the driving TFT 21 in the R pixel circuit. Likewise, the initial voltage Vint_G and the reference voltage Vref_G are used for threshold correction of the driving TFT 21 in the G pixel circuit, and the initial voltage Vint_B and the reference voltage Vref_B, are used for threshold correction of the driving TFT 21 in the B pixel circuit.

Figure 4:
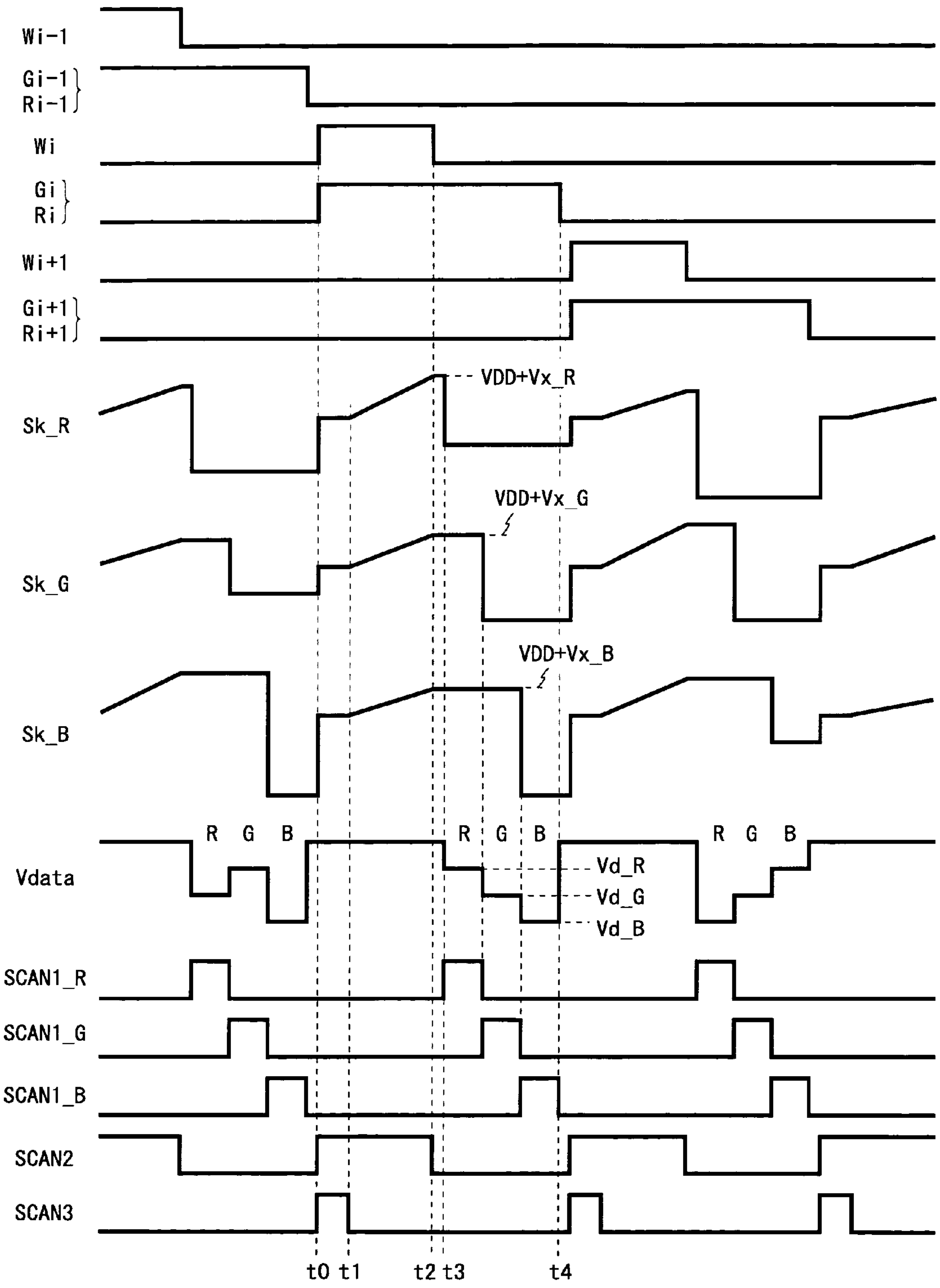
FIG. 4 is a timing chart showing a method for driving pixel circuits in the display device shown in FIG. 1.

FIG. 4 is a timing chart showing a method for driving pixel circuits 20. With reference to FIG. 4, operations will be described below that are performed when data voltages Vdata are respectively written into three pixel circuits 20 connected to a corresponding scanning line Gi and the data lines Sk_R, Sk_G, and Sk_B, using the R output circuit 30*r*, the G output circuit 30*g*, and the B output circuit 30*b* (hereinafter, also collectively referred to as the three output circuits 30). In FIG. 4, a period from time t0 to time t4 is a selection period of the three pixel circuits 20. Before time t2, a process of parallelly detecting gate terminal potentials of the driving TFTs 21 of the three pixel circuits 20 is performed. After time t2, a process of writing corrected data voltages into the three pixel circuits 20 in turn is performed.

Before time t0, the potentials of the scanning line Gi and control lines Wi and Ri are controlled to a low level. Therefore, in each of the three pixel circuits 20, the switching TFTs 22 and 23 are in a non-conducting state and the switching TFT 24 is in a conducting state. At this time, since the driving TFT 21 is in a conducting state, a current flows to the organic EL element 25 from a power supply wiring line Vp through the driving TFT 21 and the switching TFT 24, and thus, the organic EL element 25 emits light. As such, before time t0, the organic EL elements 25 in the three pixel circuits 20 are all in a light-emitting state.

When at time t0 the potentials of the scanning line Gi and the control lines Wi and Ri are changed to a high level, in each of the three pixel circuits 20, the switching TFTs 22 and 23 change to a conducting state and the switching TFT 24 changes to a non-conducting state. In addition, since at time t0 the potential of the control line SCAN3 changes to a high level, in each of the three output circuits 30 the switch 36 changes to a conducting state. Hence, the potential of the data line Sk_R and the potential at the node A in the R pixel circuit reach Vint_R. Likewise, the potential of the data line Sk_G and the potential at the node A in the G pixel circuit reach Vint_G, and the potential of the data line Sk_B and the potential at the node A in the B pixel circuit reach Vint_B. After time t0, in each of the three pixel circuits 20, a current having passed through the driving TFT 21 flows into the node A through the switching TFT 23.

Then, when at time t1 the potential of the control line SCAN3 is changed to a low level, in each of the three output circuits, the switch 36 changes to a non-conducting state. After time t1, too, in each of the three pixel circuits 20, a current having passed through the driving TFT 21 flows into the node A through the switching TFT 23, and thus, the potential at the node A rises while the driving TFT 21 is in a conducting state. At this time, since the switching TFT 22 is in a conducting state, the potentials of the data lines Sk_R, Sk_G, and Sk_B are equal to the respective potentials at the nodes A in the three pixel circuits 20.

During a period from time t0 to time t2, the potentials of the control lines SCAN1_R, SCAN1_G, and SCAN1_B are controlled to a low level, and the potential of the control line SCAN2 is controlled to a high level. Hence, in each of the three output circuits 30, the switches 31 and 32 are placed in a conducting state and the switches 33 and 34 are placed in a non-conducting state. Therefore, in the R output circuit 30*r*, the potential at the node C reaches Vref_R, and the potential at the node B becomes equal to the potential of the data line Sk_R and the potential at the node A in the R pixel circuit. Likewise, in the G output circuit 30*g*, the potential at the node C reaches Vref_G, and the potential at the node B becomes equal to the potential of the data line Sk_G and the potential at the node A in the G pixel circuit. In the B output circuit 30*b*, the potential at the node C reaches Vref_B, and the potential at the node B becomes equal to the potential of the data line Sk_B and the potential at the node A in the B pixel circuit.

Then, when at time t2 the potential of the control line Wi is changed to a low level, in each of the three pixel circuits 20, the switching TFT 23 changes to a non-conducting state. In addition, since at time t2 the potential of the control line SCAN2 changes to a low level, in each of the three output circuits 30, the switches 31 and 32 change to a non-conducting state. The potentials at the nodes A in the R pixel circuit, the G pixel circuit, and the B pixel circuit immediately before time t2 are assumed to be (VDD+Vx_R), (VDD+Vx_G), and (VDD+Vx_B), respectively. Note that the voltages Vx_R, Vx_G, and Vx_B all have negative values and are assumed to satisfy the following: |Vx_R|>|Vth_R|, |Vx_G|>|Vth_G|, and |Vx_B|>|Vth_B|.

When at time t2 the switches 31 and 32 are changed to a non-conducting state, a voltage (VDD+Vx_R−Vref_R) is held in the capacitor 37 in the R output circuit 30*r*. Likewise, a voltage (VDD+Vx_G−Vref_G) is held in the capacitor 37 in the G output circuit 30*g*, and a voltage (VDD+Vx_B−Vref_B) is held in the capacitor 37 in the B output circuit 30*b*.

As described above, the potential at the node A in the R pixel circuit rises while the driving TFT 21 is in a conducting state. Thus, if there is sufficient time, then the potential at the node A in the R pixel circuit rises until the gate-source voltage of the driving TFT 21 reaches the threshold voltage Vth_R (negative value) (i.e., the driving TFT 21 is placed in a threshold state), and reaches (VDD+Vth_R) in the end. However, in the display device 10, time t2 comes while the driving TFT 21 is in a conducting state (i.e., before the driving TFT 21 is placed in a threshold state). Thus, the potential (VDD+Vx_R) at the node A immediately before time t2 is lower than (VDD+Vth_R). The voltage Vx_R changes according to the threshold voltage Vth_R, and the larger the absolute value of the threshold voltage Vth_R, the larger the absolute value of the voltage Vx_R. Likewise, the potential (VDD+Vx_G) at the node A in the G pixel circuit immediately before time t2 is lower than (VDD+Vth_G), and the larger the absolute value of the threshold voltage Vth_G, the larger the absolute value of the voltage Vx_G. In addition, the potential (VDD+Vx_B) at the node A in the B pixel circuit immediately before time t2 is lower than (VDD+Vth_B), and the larger the absolute value of the threshold voltage Vth_B, the larger the absolute value of the voltage Vx_B.

Then, during a period from time t3 to time t4, the potentials of the control lines SCAN1_R, SCAN1_G, and SCAN1_B change to a high level in turn for a predetermined period of time. In synchronization with this, the data voltage Vdata outputted from the latch 17 changes to Vd_R, Vd_G, and Vd_B.

While the potential of the control line SCAN1_R is at a high level, the data voltage Vd_R outputted from the latch 17 is applied to the node C in the R output circuit 30*r*, and the node B is connected to the data line Sk_R through the switch 34 and the analog buffer 38. In the R output circuit 30*r*, while the capacitor 37 holds the voltage (VDD+Vx_R−Vref_R), the potential at the node C changes from Vref_R to Vd_R. Therefore, the potential at the node B also changes by the same amount (Vd_R−Vref_R) and reaches (VDD+Vx_R)+(Vd_R−Vref_R)=(VDD+Vx_R+Vd_R−Vref_R). At this time, the switches 34 and 35 in the R output circuit 30*r* are in a conducting state and the input voltage and output voltage of the analog buffer 38 are equal, and thus, the potential of the data line Sk_R reaches (VDD+Vx_R+Vd_R−Vref_R) which is the same as that at the node B in the R output circuit 30*r*. At this time, since in the R pixel circuit the switching TFT 22 is in a conducting state, the node A reaches the same potential as the data line Sk_R.

Likewise, while the potential of the control line SCAN1_G is at a high level, the potential at the node B in the G output circuit 30*g* reaches (VDD+Vx_G+Vd_G−Vref_G), and the potential of the data line Sk_G and the potential at the node A in the G pixel circuit become equal to (VDD+Vx_G+Vd_G−Vref_G). In addition, while the potential of the control line SCAN1_B is at a high level, the potential at the node B in the B output circuit 30*b* reaches (VDD+Vx_B+Vd_B−Vref_B), and the potential of the data line Sk_B and the potential at the node A in the B pixel circuit become equal to (VDD+Vx_B+Vd_B−Vref_B).

Then, when at time t4 the potentials of the scanning line Gi and the control line Ri are changed to a low level, in each of the three pixel circuits 20, the switching TFT 22 changes to a non-conducting state and the switching TFT 24 changes to a conducting state. After time t4, the potentials of the control lines SCAN1_R, SCAN1_G, and SCAN1_B change to a low level, and thus, in each of the three output circuits 30, the switches 33 and 34 are placed in a non-conducting state.

At time t4, the gate-source voltage (Vx_R+Vd_R−Vref_R) of the driving TFT 21 is held in the capacitor 26 in the R pixel circuit. Likewise, the voltage (Vx_G+Vd_G−Vref_G) is held in the capacitor 26 in the G pixel circuit, and the voltage (Vx_B+Vd_B−Vref_B) is held in the capacitor 26 in the B pixel circuit. Note that an ON potential (low-level potential) provided to the control line Ri is determined such that the switching TFT 24 operates in a linear region.

After time t4, the voltages held in the capacitors 26 in the three pixel circuits 20 do not change. Hence, the potential at the node A in the R pixel circuit remains at (VDD+Vx_R+Vd_R−Vref_R). Likewise, the potential at the node A in the G pixel circuit remains at (VDD+Vx_G+Vd_G−Vref_G), and the potential at the node A in the B pixel circuit remains at (VDD+Vx_B+Vd_B−Vref_B). Therefore, in each of the three pixel circuits 20, during a period after time t4 and before the potential of the control line Ri changes to a high level next time, a current flows to the organic EL element 25 from the power supply wiring line Vp through the driving TFT 21 and the switching TFT 24, and thus, the organic EL element 25 emits light. The amount of current flowing through the driving TFT 21 at this time increases and decreases according to the potential at the node A; however, as shown in the following, even if the threshold voltage of the driving TFT 21 is different, if the data voltage is the same, then the amount of current can be made to be the same.

As an example, the R pixel circuit will be described. When the driving TFT 21 in the R pixel circuit is allowed to operate in a saturation region, a current $I_{EL}$ flowing between the drain and the source is given by the following equation (1), neglecting the channel length modulation effect.

$$I_{EL}=-\tfrac{1}{2}\cdot W/L\cdot Cox\cdot\mu\cdot(Vg-VDD-Vth\_R) \qquad (1)$$

Note that in equation (1) W/L is the aspect ratio of the driving TFT 21, Cox is the gate capacitance, μ is the mobility, and Vg is the gate terminal potential (potential at the node A).

The current $I_{EL}$ shown in equation (1) generally changes according to the threshold voltage Vth_R. In the R pixel circuit, when the organic EL element 25 emits light, the gate terminal potential Vg of the driving TFT 21 reaches (VDD+Vx_R+Vd_R−Vref_R), and thus, the current $I_{EL}$ is as shown in the following equation (2).

$$I_{EL}=-\tfrac{1}{2}\cdot W/L\cdot Cox\cdot\mu\cdot\{Vd\_R-Vref\_R+(Vx\_R-Vth\_R)\}^2 \qquad (2)$$

In equation (2), if the voltage Vx_R coincides with the threshold voltage Vth_R, then the current $I_{EL}$ does not depend on the threshold voltage Vth_R. Also, even if the voltage Vx_R does not coincide with the threshold voltage Vth_R, if the difference therebetween is constant, then the current $I_{EL}$ does not depend on the threshold voltage Vth_R.

In the display device 10, the length of a threshold correction period (period from time t1 to time t2) and the level of the initial voltage Vint_R are determined such that the difference in voltage Vx_R is substantially the same as the difference in threshold voltage Vth_R between two TFTs in the R pixel circuit. Hence, the voltage difference (Vx_R−Vth_R) included in equation (2) is substantially constant. Therefore, in the R pixel circuit, regardless of the value of the threshold voltage Vth_R, a current of an amount according to the data voltage Vd_R flows through the organic EL element 25, and thus, the organic EL element 25 emits light at a luminance according to the data voltage Vd_R.

Likewise, in the G pixel circuit, regardless of the value of the threshold voltage Vth_G, a current of an amount according to the data voltage Vd_G flows through the organic EL element 25, and thus, the organic EL element 25 emits light at a luminance according to the data voltage Vd_G. In addition, in the B pixel circuit, regardless of the value of the threshold voltage Vth_B, a current of an amount according to the data voltage Vd_B flows through the organic EL element 25, and thus, the organic EL element 25 emits light at a luminance according to the data voltage Vd_B. In the display device 10, threshold correction is performed by the output circuits 30 provided external to the pixel circuits 20, but there is no need to provide complex logic circuits, memories, etc., in the output circuits 30.

The initial voltages Vint_R, Vint_G, and Vint_B will be described below. In the pixel circuit 20, when the switching TFT 23 is placed in a conducting state at time t0 shown in FIG. 4, the driving TFT 21 is placed in a diode-connected state. In a conventional organic EL display, a period from when a driving TFT is diode-connected until the gate-source voltage Vgs of the driving TFT sufficiently approaches a threshold voltage Vth is a threshold correction period. This is because if the voltage Vgs sufficiently approaches the threshold voltage Vth, then a difference in threshold voltage between two driving TFTs can be detected.

However, in a high-definition display device, the selection period of a pixel circuit may be so short that the voltage Vgs may not be able to sufficiently approach the threshold voltage Vth within the selection period. In particular, in the display device 10 according to the present embodiment, since the parasitic capacitances of the capacitor 37 and the data line Sj need to be charged when a threshold voltage Vth of the driving TFT 21 is detected, some contrivance is required to perform a process of detecting a threshold voltage and a process of writing a corrected data voltage within a selection period.

In view of this, in the display device 10, in order to detect variations in threshold voltage before starting a process of writing corrected data voltages, initial voltages Vint_R, Vint_G, and Vint_B are fixedly provided to the data lines Sk_R, Sk_G, and Sk_B, respectively, by the action of the switches 36. By this, the time required for a voltage according to the threshold voltage Vth of the driving TFT 21 to be outputted to the data line Sj can be reduced. Therefore, even if the threshold correction period is short, variations in correction effect can be suppressed, enabling to improve image quality.

The initial voltages Vint_R, Vint_G, and Vint_B are determined based on the length of the threshold correction period, the accuracy required for threshold correction, etc. When the switching TFT 23 is in a conducting state and the driving TFT 21 is diode-connected, the following equation (3) is established for the current balance of the driving TFT 21.

$$k(Vgs(t)-Vth)^2 = -C\frac{dVgs(t)}{dt} \tag{3}$$

Note that in equation (3) k is a constant and C is the sum of a holding capacitance and a signal line capacitance.

When this differential equation is solved, the following equation (4) is obtained.

$$Vgs(t) = \frac{1}{\frac{k}{C}t + \frac{1}{Vgs0 - Vth}} + Vth \tag{4}$$

Note that in equation (4), Vgs0 is the initial value of the voltage Vgs.

When two TFTs whose threshold voltages differ by ΔVth are considered, if the difference in voltage Vgs between the two TFTs approaches ΔVth after a lapse of a predetermined period of time, then it can be said that the threshold voltages of the respective TFTs have been detected. The difference in voltage Vgs is given by the following equation (5).

$$\Delta Vgs(t) = \Delta Vth + \frac{1}{\frac{k}{C}t + \frac{1}{Vgs0 - Vth - \Delta Vth}} - \frac{1}{\frac{k}{C}t + \frac{1}{Vgs0 - Vth}} \tag{5}$$

Therefore, the initial value Vgs0 of the voltage Vgs is determined such that ΔVgs (t) shown in equation (5) sufficiently approaches ΔVth within allowed time, and the initial voltages Vint_R, Vint_G, and Vint_R are determined according to the determined initial value Vgs0.

Figure 5:
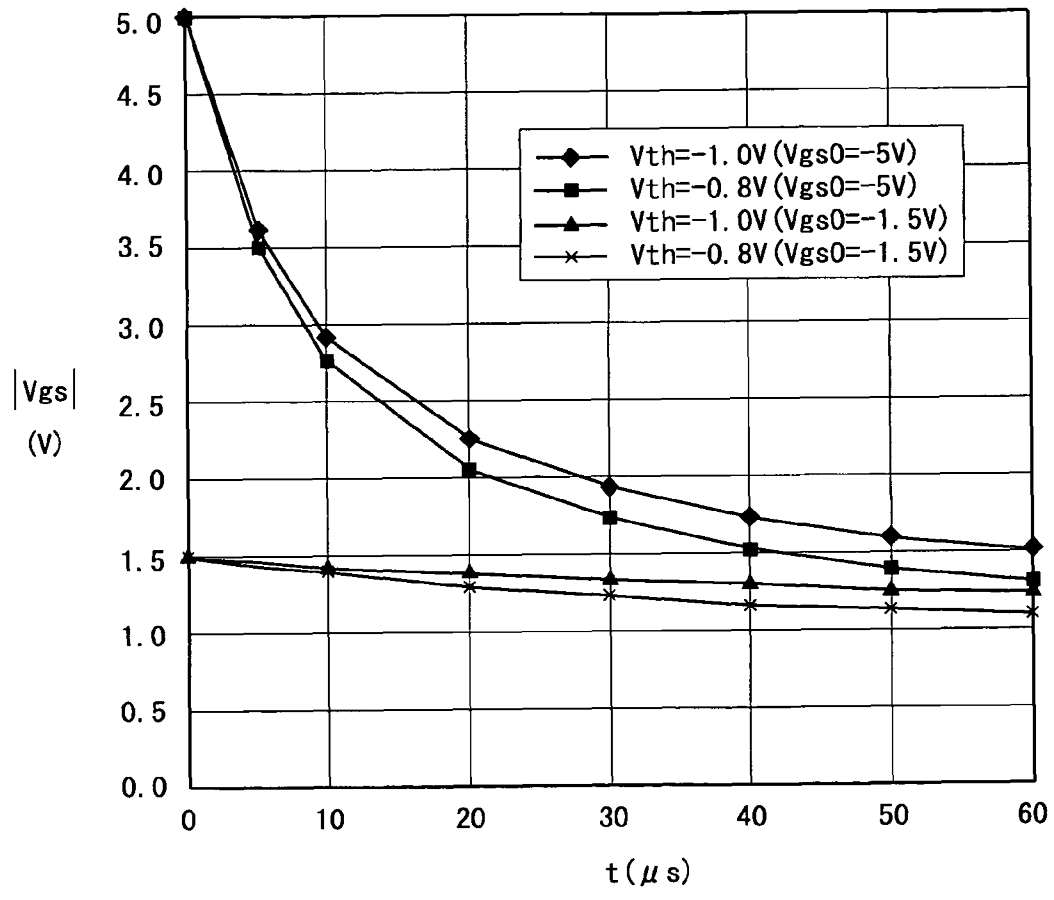
FIG. 5 is a diagram showing an example of temporal changes in the gate-source voltages of diode-connected TFTs.

FIG. 5 is a diagram showing an example of temporal changes in the gate-source voltages Vgs of diode-connected driving TFTs. FIG. 5 shows changes in gate-source voltage Vgs for when two types of voltages Vgs0 (Vgs0=−5 V and Vgs0=−1.5 V) are provided in advance to two TFTs with different threshold voltages (Vth=−0.8 V and Vth=−1.0 V), and thereafter, the source and drain terminals of each TFT are short-circuited, whereby each TFT is diode-connected.

The voltages Vgs0 are provided in advance to the two TFTs and the absolute values |Vgs| of the voltages Vgs after a lapse of 30 μs are compared. In the case of |Vgs0|=5, after 30 μs, two values |Vgs| are far from their respective final values (0.8 V and 1.0 V), but the difference therebetween is already substantially equal to a final value (0.2 V). On the other hand, in the case of |Vgs0|=1.5 V, after 30 μs, two values |Vgs| are close to their respective final values, but the difference therebetween is still far from the final value. As such, the larger the |Vgs0|, the faster the increase in difference between the two values |Vgs|, and thus, the threshold correction period can be reduced. Accordingly, to perform threshold correction with high accuracy, it is desirable to increase |Vgs0|. Meanwhile, when |Vgs0| is increased, power consumption increases due to the charging and discharging of the data line Sj and the capacitor 37.

Taking this point into account, the display device 10 uses three types of initial voltages Vint_R, Vint_G, and Vint_B. The initial voltage Vint_R is used for R pixel circuits, the initial voltage Vint_G is used for G pixel circuits, and the initial voltage Vint_B is used for B pixel circuits. The three types of initial voltages are determined as follows. A gate-source voltage (VDD−Vint_R) obtained when the initial voltage Vint_R is applied to the gate terminal of the driving TFT 21 in the R pixel circuit is hereinafter referred to as Vgs0_R. Likewise, a gate-source voltage obtained when the initial voltage Vint_G is applied to the gate terminal of the driving TFT 21 in the G pixel circuit is referred to as Vgs0_G, and a gate-source voltage obtained when the initial voltage Vint_B is applied to the gate terminal of the driving TFT 21 in the B pixel circuit is referred to as Vgs0_B.

In the display device 10, at least two of the initial voltages Vint_R, Vint_G, and Vint_B are set to differ from each other. Specifically, it is desirable that the initial voltage Vint_G for G pixel circuits differ from the initial voltage Vint_B for B pixel circuits, and |Vgs0_G1|<|Vgs0_B| be satisfied. It is more desirable that the initial voltages Vint_R, Vint_G, and Vint_B all differ from one another, and |Vgs0_G|<|Vgs0_R|<|Vgs0_B| be satisfied. All of the initial voltages Vint_R, Vint_G, and Vint_B are set to a level lower than the supply voltage VDD. When the initial voltages Vint_R, Vint_G, and Vint_B are set in this manner, the current flowing through the switching TFT 23 during a conduction period of the switching TFT 23 is largest in the B pixel circuit among three types of pixel circuits, and is smallest in the G pixel circuit.

Figure 6:
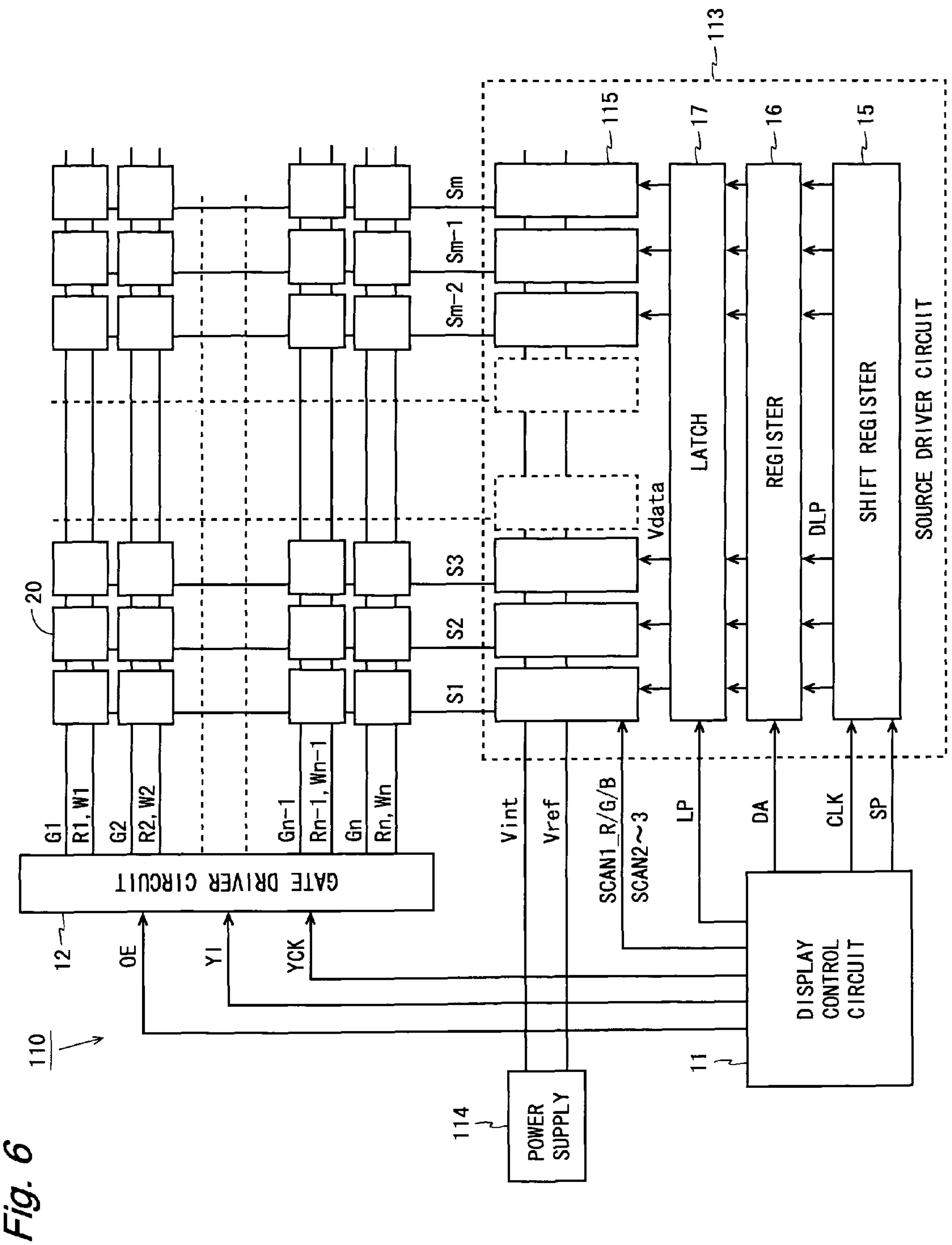
FIG. 6 is a block diagram showing a configuration of a display device according to a reference example.
Figure 7:
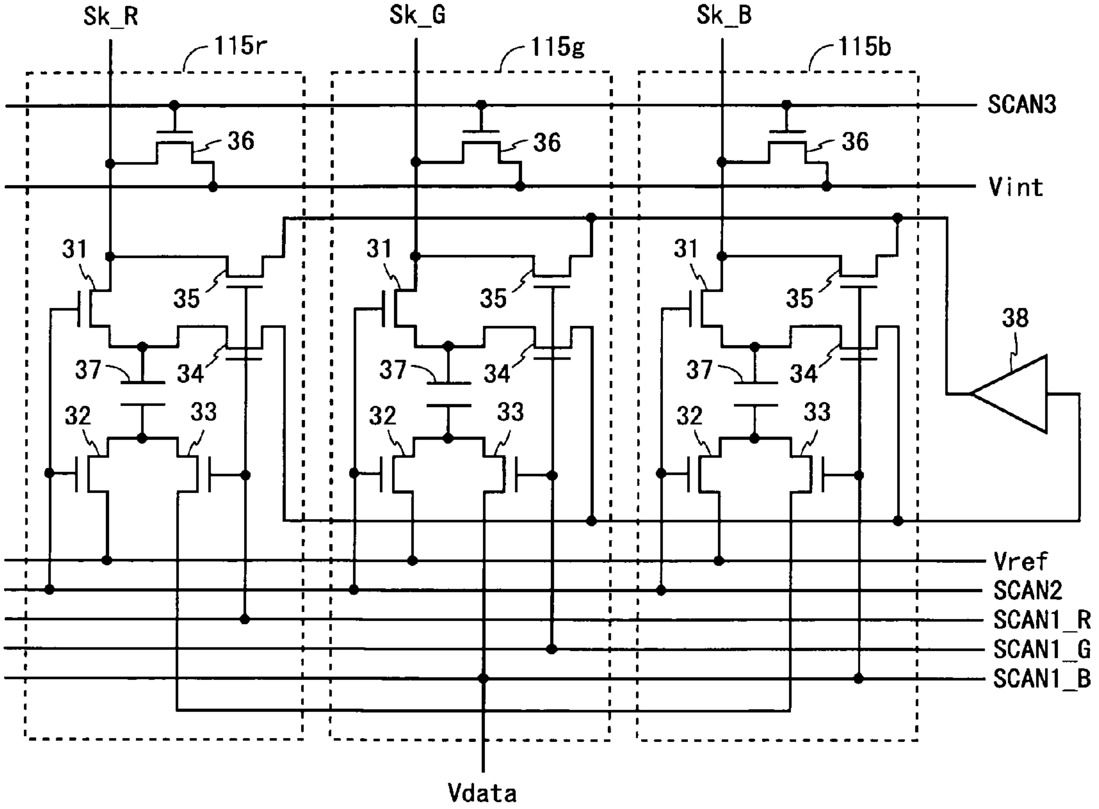
FIG. 7 is a circuit diagram of output circuits included in the display device shown in FIG. 6.

The effects of the display device 10 according to the present embodiment will be described below, compared to a display device according to a reference example. FIG. 6 is a block diagram showing a configuration of a display device according to a reference example. A display device 110 shown in FIG. 6 includes a source driver circuit 113 including output circuits 115, instead of the source driver circuit 13 including the output circuits 30. FIG. 7 is a circuit diagram of output circuits 115. A power supply 114 shown in FIG. 6 supplies supply voltages VDD and VSS to pixel circuits 20, and supplies one type of initial voltage Vint and one type of reference voltage Vref to the output circuits 115. The display device 110 operates according to the same timing chart (FIG. 4) as that for the display device 10. Note that the display device 110 is described in another application (International Patent Application No. PCT/2007/69184) having a common applicant and a common inventor with the present application.

In the display device 10 according to the present embodiment and the display device 110 according to the reference example, when threshold correction of a driving TFT 21 is performed, an initial voltage is applied to the gate terminal of the driving TFT 21. At this time, as described above, when such an initial voltage is used that increases the absolute value |Vgs0| of the initial value of the gate-source voltage of the driving TFT 21, the accuracy of threshold correction increases, and when such an initial voltage that reduces |Vgs0| is used, power consumption decreases.

In the display device 110 according to the reference example, one type of initial voltage Vint is used in the entire device. Hence, when the initial voltage Vint is determined with reference to green, |Vgs0| decreases and thus power consumption decreases. However, the accuracy of threshold correction for blue and red is insufficient, and thus, image quality degrades. On the other hand, when the initial voltage Vint is determined with reference to blue, |Vgs0| increases and thus image quality improves. However, since the same initial voltage is also used for green and red that are only more insensitively discriminable than blue, power consumption increases more than necessary.

On the other hand, in the display device 10 according to the present embodiment, a plurality of initial voltages Vint_R, Vint_G, and Vint_B are used, and at least two of them differ from each other. Hence, for example, such an initial voltage Vint_B that increases |Vgs0| can be used for B pixel circuits, and such an initial voltage Vint_G that reduces |Vgs0| can be used for G pixel circuits. By this, for blue for which the human is sensitive to chromaticity differences, a large initial potential difference is provided between the gate and source terminals of a driving TFT 21, whereby threshold correction is performed with high accuracy, enabling to improve image quality. On the other hand, for green for which the human is insensitive to chromaticity differences, a small initial potential difference is provided between the gate and source terminals of a driving TFT 21, whereby excessive charging and discharging of signal lines are reduced, enabling to reduce power consumption. In addition, by using such initial voltages Vint_R, Vint_G, and Vint_B that satisfy |Vgs0_G|<|Vgs0_R|<|Vgs0_B|, the above-described effects can be further increased.

As such, according to the display device 10 according to the present embodiment, when threshold correction of a driving TFT 21 is performed, by using the initial voltage Vint_R, Vint_G, or Vint_B according to the display color, an initial potential difference provided between the gate and source terminals of the driving TFT 21 is switched according to the display color, taking into account human visual characteristics. Thus, image quality can be improved and power consumption can be reduced.

When different initial voltages are used according to the display color, it is desirable that the zeros of data voltages Vdata coincide with one another. For example, in the example shown in FIG. 5, the absolute values |Vgs| of the gate-source voltages of the driving TFTs after 30 μs for both of the case of |Vgs0|=5 V and the case of |Vgs0|=1.5 V differ from the final value. Hence, when a gate terminal voltage of a driving TFT 21 after a lapse of a predetermined period of time is detected using an initial voltage which differs depending on the display color, an offset which differs depending on the display color is added to the detected voltage. As a result, a phenomenon may occur, e.g., when black display is performed, R pixel circuits and G pixel circuits are complete black but B pixel circuits are not complete black.

In view of this, in the display device 10 according to the present embodiment, a plurality of reference voltages Vref_R, Vref_G, and Vref_B are used. As shown in equation (2), the current $I_{EL}$ flowing between the drain and source of the driving TFT 21 depends on the reference voltage Vref_R, etc. Thus, by adjusting the reference voltages Vref_R, Vref_G, and Vref_B, the zeros of data voltages Vdata for the respective colors are allowed to coincide with one another, and thus, the amplitudes of the data voltages are allowed to coincide with one another. By thus allowing the zeros of data voltages to coincide with one another in the display device 10, D/A conversion which is performed external to the display device 10 can be simplified.

Figure 8:
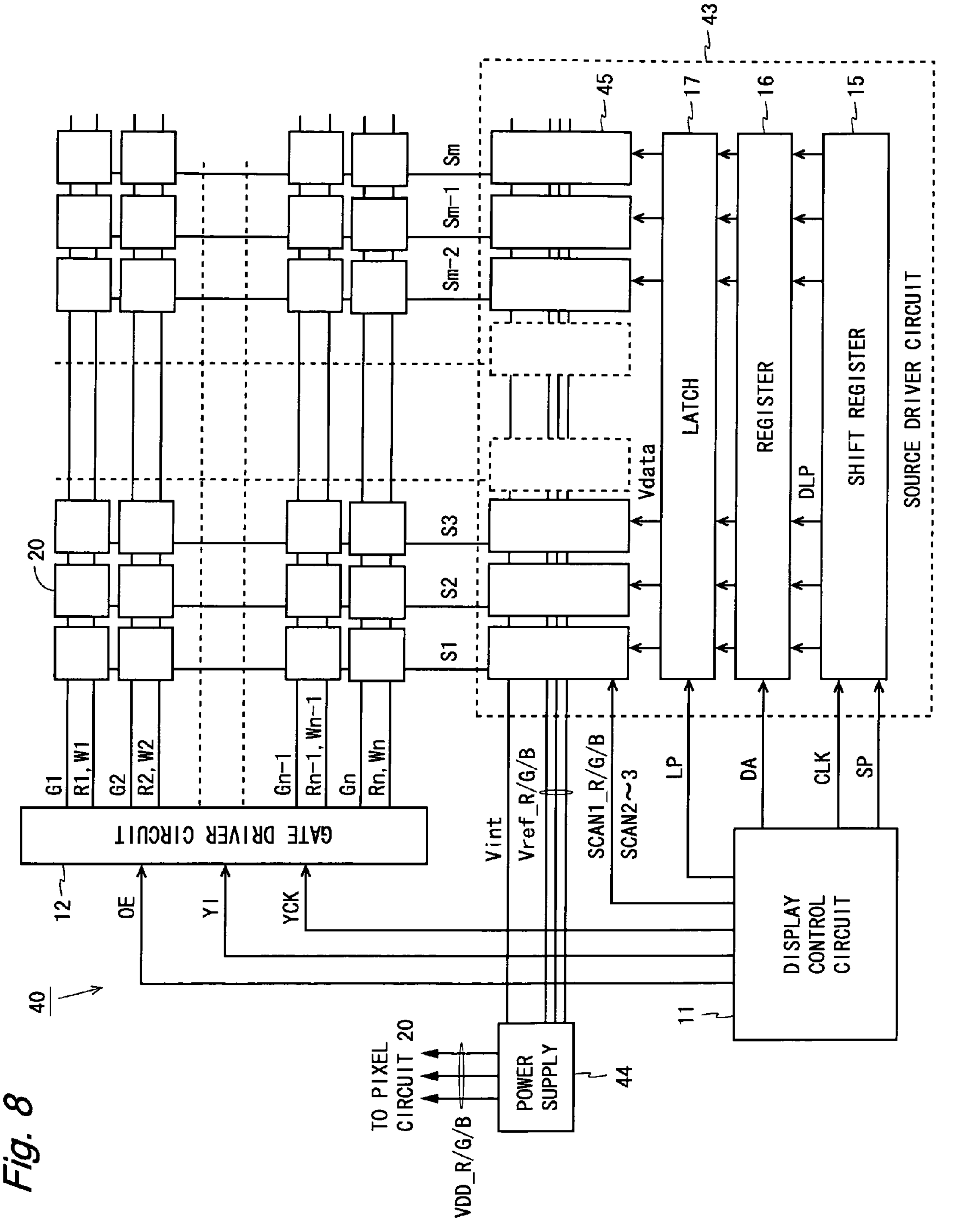
FIG. 8 is a block diagram showing a configuration of a display device according to a variant of the first embodiment of the present invention.
Figure 9:
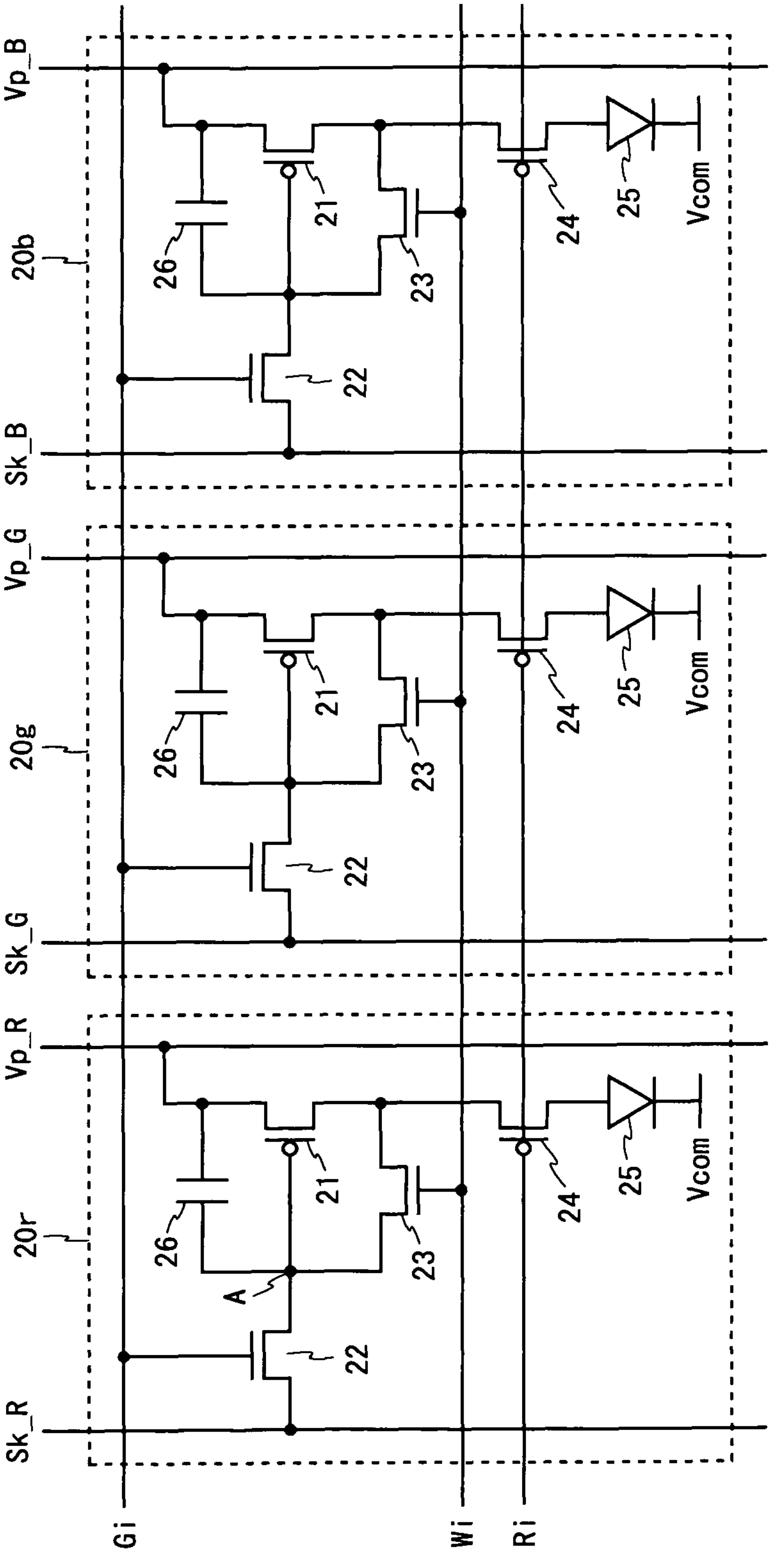
FIG. 9 is a circuit diagram of pixel circuits included in the display device shown in FIG. 8.
Figure 10:
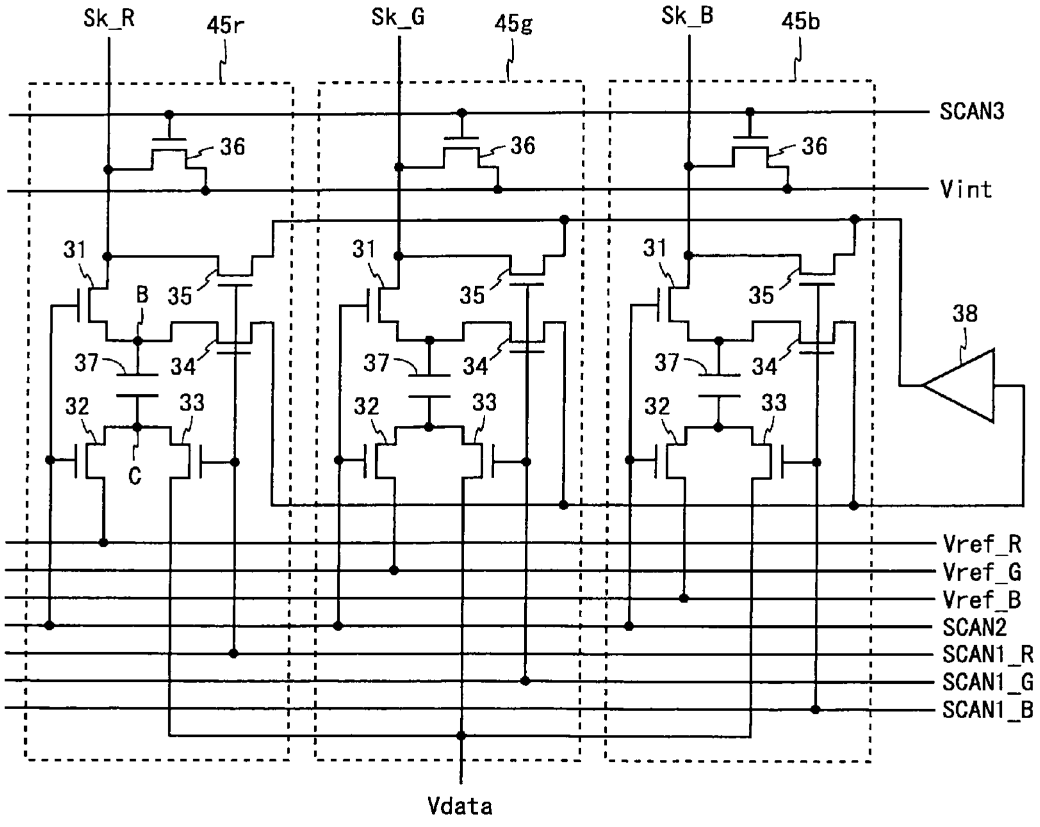
FIG. 10 is a circuit diagram of output circuits included in the display device shown in FIG. 8.

Note that in the above-described display device 10, in order to provide an initial potential difference according to the display color between the gate and source terminals of a driving TFT 21, an initial voltage applied to a data line is switched according to the display color; however, instead of this, a supply voltage applied to the source terminal of the driving TFT 21 may be switched according to the display color. FIG. 8 is a block diagram showing a configuration of a display device according to a variant of the first embodiment of the present invention. A display device 40 shown in FIG. 8 includes a source driver circuit 43 including output circuits 45 instead of the source driver circuit 13 including the output circuits 30, and includes a power supply 44 instead of the power supply 14. FIG. 9 is a circuit diagram of pixel circuits 20 included in the display device 40, and FIG. 10 is a circuit diagram of the output circuits 45.

The power supply 44 shown in FIG. 8 supplies supply voltages VDD_R, VDD_G, VDD_B, and VSS to the pixel circuits 20, and supplies an initial voltage Vint and reference voltages Vref_R, Vref_G, and Vref_B to the output circuits 45. As shown in FIG. 9, an R pixel circuit **20*r* is connected to a power supply wiring line Vp_R, a G pixel circuit 20*g* is connected to a power supply wiring line Vp_G, and a B pixel circuit 20*b* is connected to a power supply wiring line Vp_B. The supply voltage VDD_R supplied from the power supply 44 is applied to the power supply wiring line Vp_R, the supply voltage VDD_G supplied from the power supply 44 is applied to the power supply wiring line Vp_G, and the supply voltage VDD_B supplied from the power supply 44 is applied to the power supply wiring line Vp_B. In an R output circuit 45*r*, a G output circuit 45*g*, and a B output circuit 45*b* shown in FIG. 10, the same initial voltage Vint supplied from the power supply 44 is applied to one terminal of each switch 36**.

In the display device 40, at least two of the supply voltages VDD_R, VDD_G, and VDD_B are set to differ from each other. Specifically, it is desirable that the supply voltage VDD_G for G pixel circuits differ from the supply voltage VDD_B for B pixel circuits, and |Vgs0_G|<|Vgs0_B| be satisfied. It is more desirable that the supply voltages VDD_R, VDD_G, and VDD_B all differ from one another, and |Vgs0_G|<|Vgs0_R|<|Vgs0_B| be satisfied (i.e., VDD_G<VDD_R<VDD_B be satisfied).

Even with the display device 40 configured in this manner, by using the supply voltage VDD_R, VDD_G, or VDD_B according to the display color, when threshold correction of a driving TFT 21 is performed, an initial potential difference provided between the gate and source terminals of the driving TFT 21 is switched according to the display color, taking into account human visual characteristics. Thus, image quality can be improved and power consumption can be reduced. In addition, by using a plurality of reference voltages Vref_R, Vref_G, and Vref_B, the zeros of data voltages are allowed to coincide with one another in the display device 40, and thus, D/A conversion which is performed external to the display device 40 can be simplified.

Note that although in the above description one analog buffer is provided for three data lines Sk_R, Sk_G, and Sk_B, one analog buffer may be provided for p data lines (p is any integer greater than or equal to 1).

SECOND EMBODIMENT

Figure 11:
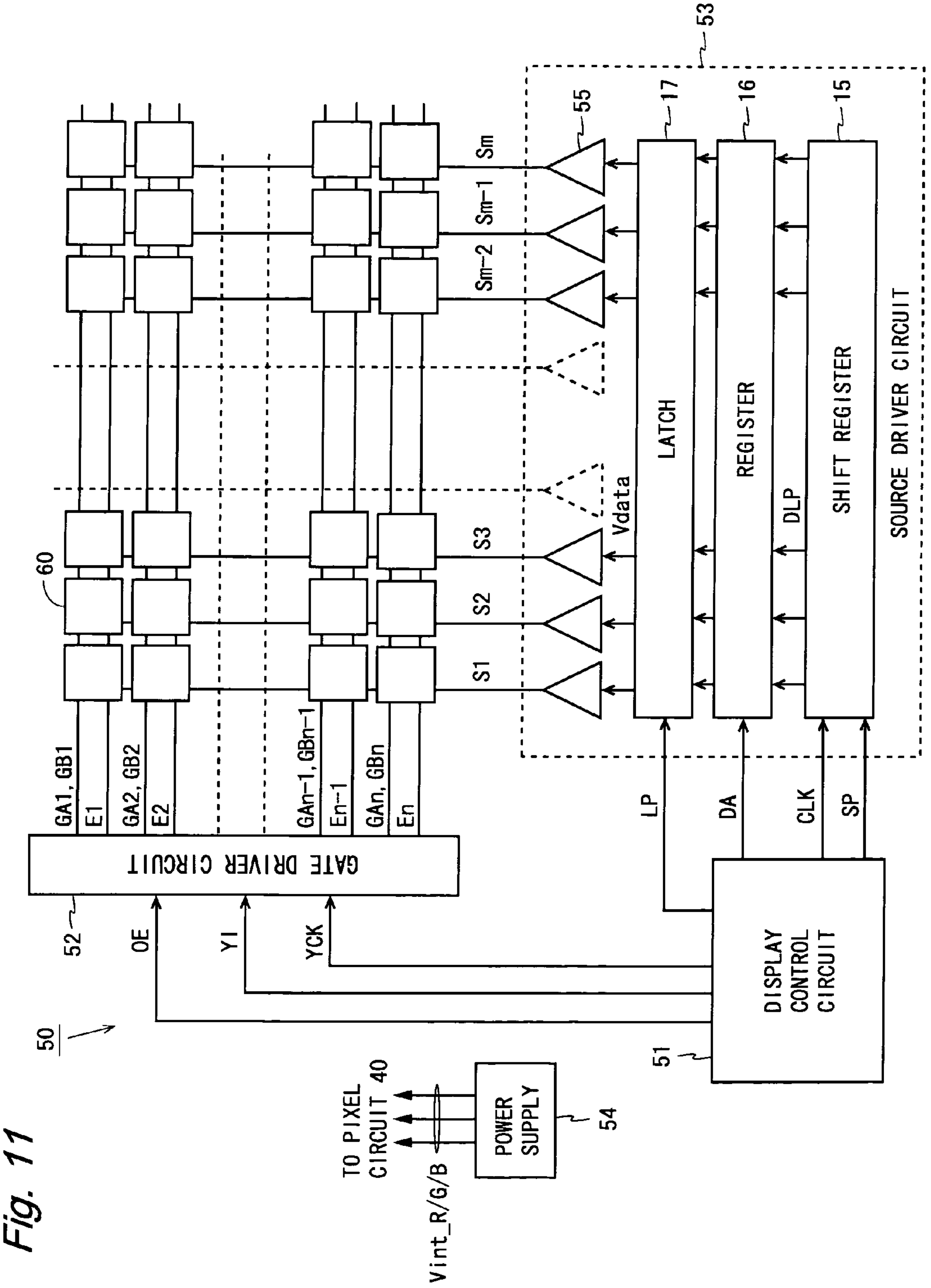
FIG. 11 is a block diagram showing a configuration of a display device according to a second embodiment of the present invention.

FIG. 11 is a block diagram showing a configuration of a display device according to a second embodiment of the present invention. A display device 50 shown in FIG. 11 includes a display control circuit 51, a gate driver circuit 52, a source driver circuit 53, a power supply 54, and (m×n) pixel circuits 60, and performs color display by three RGB colors. Of the components in the present embodiment, the same components as those in the first embodiment are denoted by the same reference numerals and description thereof is omitted. The following describes differences from a display device 10 according to the first embodiment.

In the display device 50, n scanning lines GAi parallel to one another and m data lines Sj parallel to one another and intersecting perpendicularly with the scanning lines GAi are provided. The pixel circuits 60 are arranged in a matrix form at respective intersections of the scanning lines GAi and the data lines Sj. In addition, n scanning lines GBi and n control lines Ei which are parallel to one another are arranged parallel to the scanning lines GAi. The scanning lines GAi and GBi and the control lines Ei are connected to the gate driver circuit 52, and the data lines Sj are connected to the source driver circuit 53. Ina region where the pixel circuits 60 are arranged, a power supply wiring line Vp, a common cathode Vcom, and three types of precharge lines (none of which are shown) are arranged.

As in the first embodiment, the pixel circuits 60 are classified into R pixel circuits, G pixel circuits, and B pixel circuits. The R pixel circuits are arranged in a (3k−2)th column, the G pixel circuits are arranged in a (3k−1) th column, and the B pixel circuits are arranged in a 3k-th column.

The display control circuit 51 is such that the function of controlling the potentials of control lines SCAN1_R, SCAN1_G, SCAN1_B, SCAN2, and SCAN3 is removed from a display control circuit 11 according to the first embodiment. The gate driver circuit 52 has the same configuration as a gate driver circuit 12 according to the first embodiment, and controls the potentials of the scanning lines GAi and GBi and the control lines Ei. The source driver circuit 53 includes an m-bit shift register 15, a register 16, a latch 17, and m analog buffers 55, and performs line sequential scanning. The analog buffers 55 are voltage follower circuits (unity gain amplifiers), and are provided to the respective data lines Sj.

The power supply 54 supplies supply voltages to each unit of the display device 50. More specifically, the power supply 54 supplies supply voltages VDD and VSS to the pixel circuits 60, and supplies initial voltages Vint_R, Vint_G, and Vint_B to the pixel circuits 60. Note that in FIG. 11 wiring lines that connect the power supply 54 to the pixel circuits 60 are omitted.

Figure 12:
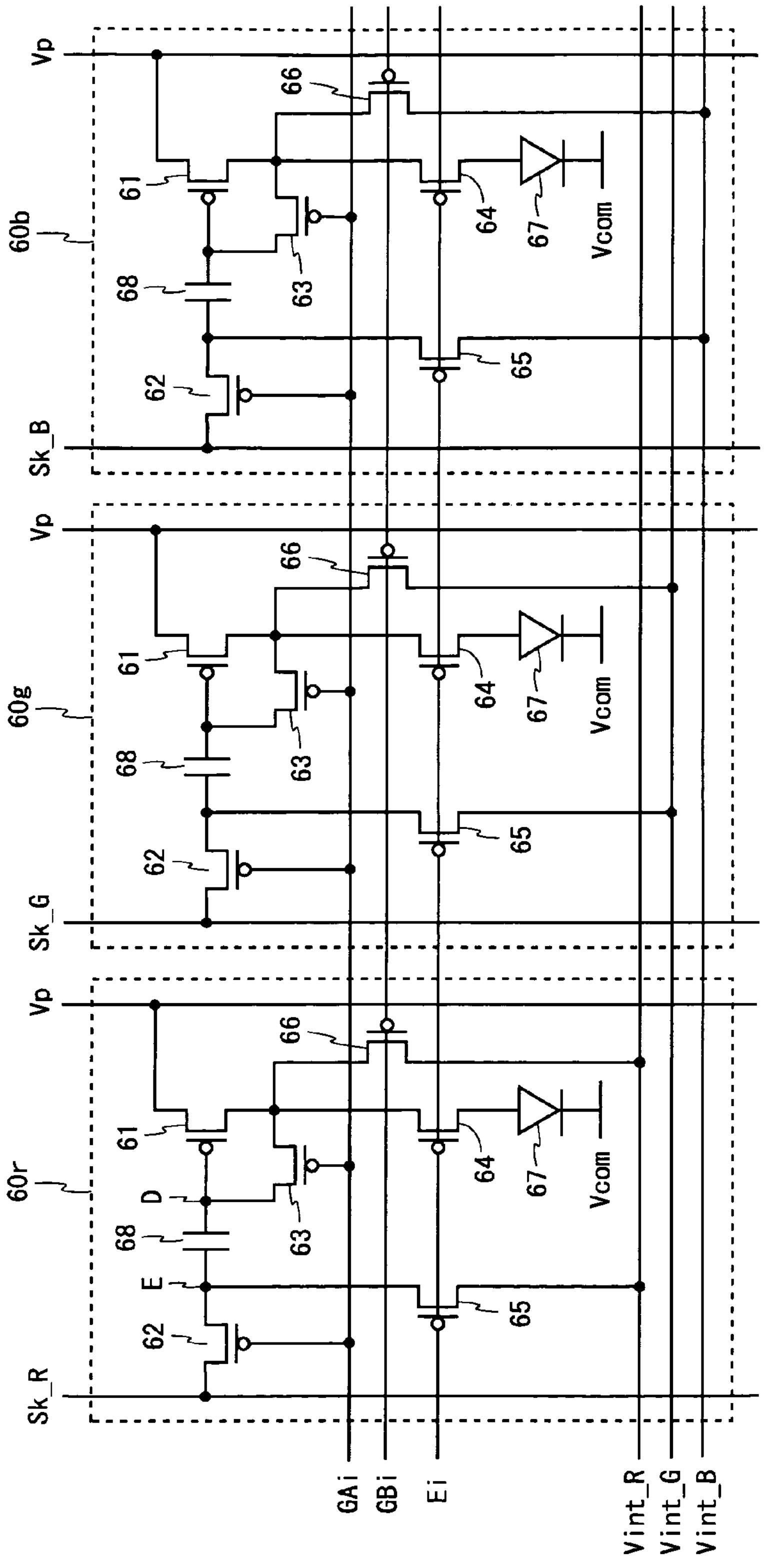
FIG. 12 is a circuit diagram of pixel circuits included in the display device shown in FIG. 11.

FIG. 12 is a circuit diagram of pixel circuits 60. FIG. 12 shows an R pixel circuit 60*r*, a G pixel circuit 60*g*, and a B pixel circuit 60*b* (hereinafter, also collectively referred to as the three pixel circuits 60). As shown in FIG. 12, each of the three pixel circuits 60 includes a driving TFT 61, switching TFTs 62 to 66, an organic EL element 67, and a capacitor 68. The driving TFT 61 is of a P-channel enhancement type and the switching TFTs 62 to 66 are of a P-channel type. The switching TFT 62 functions as a writing switching element, the switching TFT 63 functions as a compensation switching element, and the switching TFTs 65 and 66 function as initialization switching elements.

The R pixel circuit 60*r* is connected to a power supply wiring line Vp, a common cathode Vcom, a single precharge line, scanning lines GAi and GBi, a control line Ei, and a data line Sk_R. The supply voltage VDD supplied from the power supply 54 is applied to the power supply wiring line Vp, the supply voltage VSS supplied from the power supply 54 is applied to the common cathode Vcom, and the initial voltage Vint_R supplied from the power supply 54 is applied to the precharge line. The common cathode Vcom is a cathode common to all organic EL elements 67 in the display device 50.

In the R pixel circuit 60*r*, between the power supply wiring line Vp and the common cathode Vcom there are provided the driving TFT 61, the switching TFT 64, and the organic EL element 67 in series in this order from the side of the power supply wiring line Vp. Between a gate terminal of the driving TFT 61 and the data line Sk_R there are provided the capacitor 68 and the switching TFT 62 in series in this order from the gate terminal side. A node to which one electrode of the capacitor 68 (electrode on the side of the driving TFT 61) is connected is hereinafter referred to as D, and a node to which the other electrode is connected is hereinafter referred to as E. The switching TFT 63 is provided between the gate and drain terminals of the driving TFT 61. The switching TFT 65 is provided between the node E and the precharge line to which the initial voltage Vint_R is applied. The switching TFT 66 is provided between the drain terminal of the driving TFT 61 and the precharge line. Gate terminals of the switching TFTs 62 and 63 are connected to the scanning line GAi. A gate terminal of the switching TFT 66 is connected to the scanning line GBi. Gate terminals of the switching TFTs 64 and 65 are connected to the control line Ei.

The configurations of the G pixel circuit 60*g* and the B pixel circuit 60*b* are the same as that of the R pixel circuit 60*r*. Note, however, that in the G pixel circuit 60*g* one end of each of switching TFTs 65 and 66 is connected to a precharge line to which an initial voltage Vint_G is applied. Note also that in the B pixel circuit 60*b* one end of each of switching TFTs 65 and 66 is connected to a precharge line to which an initial voltage Vint_B is applied.

The threshold voltages of the driving TFTs 61 provided in the R pixel circuit 60*r*, the G pixel circuit 60*g*, and the B pixel circuit 60*b* are hereinafter referred to as Vth_R, Vth_G, and Vth_B, respectively (note that all of them have negative values). The initial voltage Vint_R is used for threshold correction of the driving TFT 61 in the R pixel circuit 60*r*. Likewise, the initial voltage Vint_G is used for threshold correction of the driving TFT 61 in the G pixel circuit 60*g*, and the initial voltage Vint_B is used for threshold correction of the driving TFT 61 in the B pixel circuit 60*b*.

Figure 13:
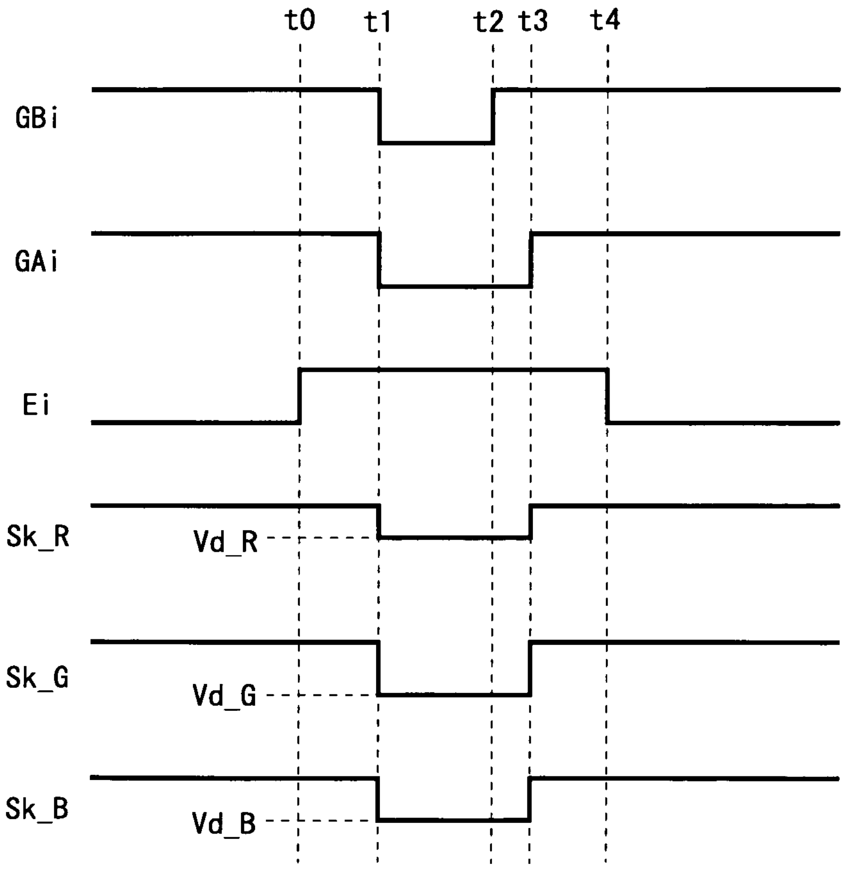
FIG. 13 is a timing chart showing a method for driving the pixel circuits in the display device shown in FIG. 11.
Figure 14:
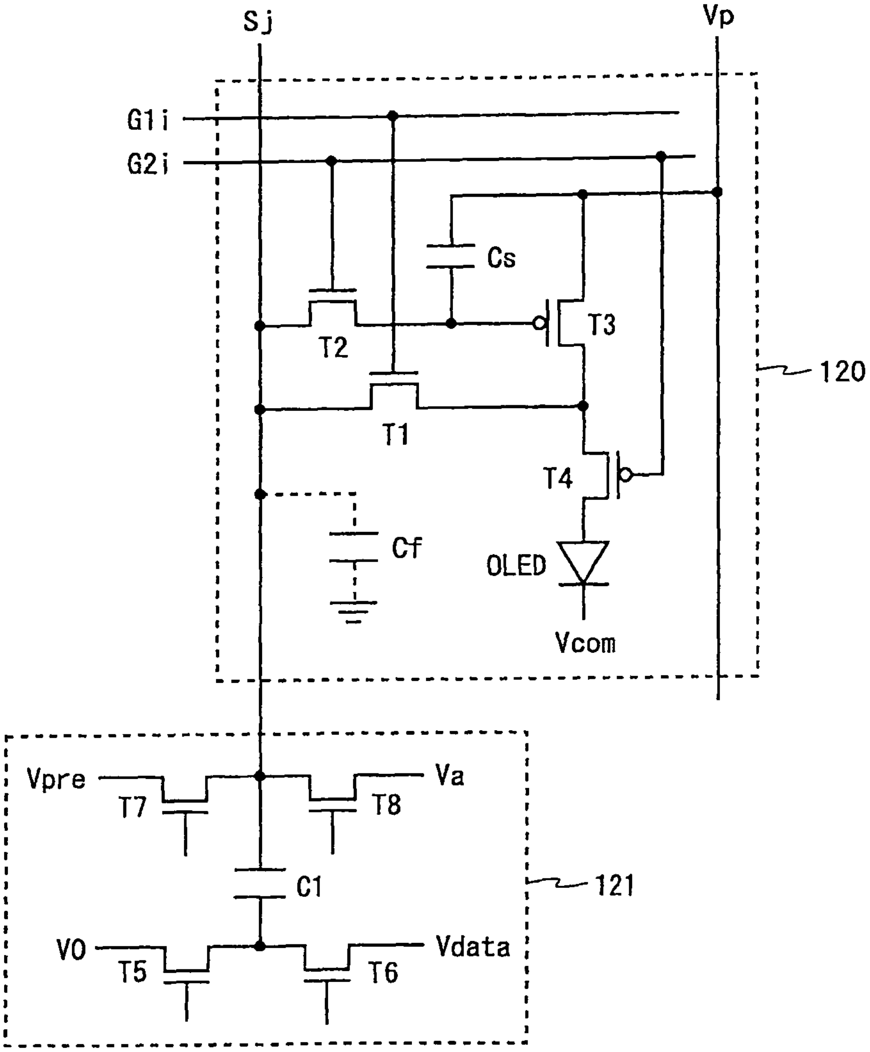
FIG. 14 is a circuit diagram of a pixel circuit and an output switch included in a conventional display device (first example).
Figure 15:
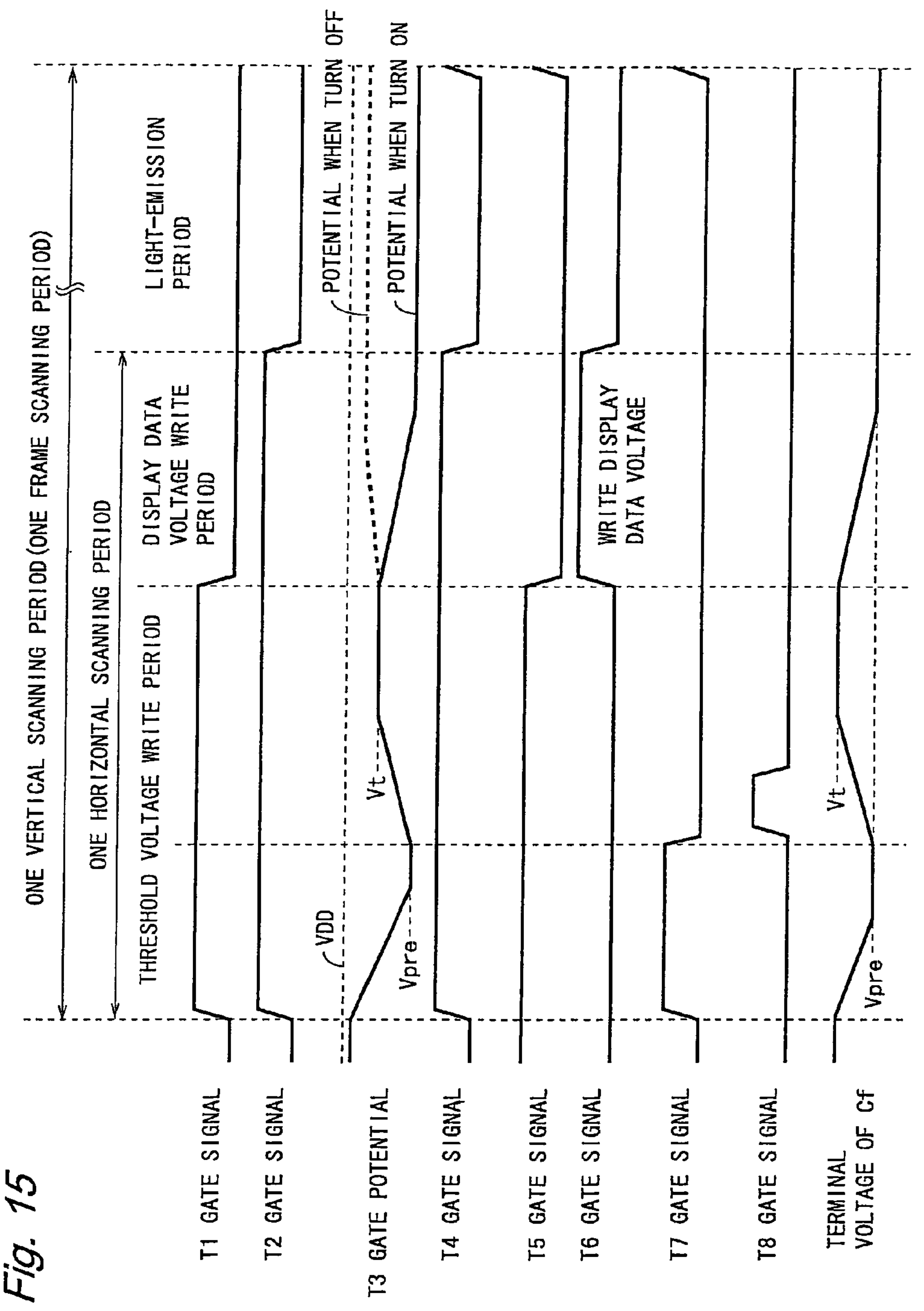
FIG. 15 is a timing chart showing a method for driving the pixel circuit shown in FIG. 14.

FIG. 13 is a timing chart showing a method for driving pixel circuits 60. With reference to FIG. 13, operations will be described below that are performed when data voltages Vdata are respectively written into three pixel circuits 60 connected to corresponding scanning signal lines GAi and GBi and data lines Sk_R, Sk_G, and Sk_B, using three analog buffers 55. In FIG. 13, a period from time t0 to time t4 is a selection period of the three pixel circuits 60. Before time t2, a process of parallelly detecting gate terminal potentials of the driving TFTs 61 of the three pixel circuits 60 is performed. After time t2, a process of parallelly writing data voltages into the three pixel circuits 60, respectively, is performed.

Before time t0, the potentials of the scanning lines GAi and GBi are controlled to a high level, and the potential of the control line Ei is controlled to a low level. Hence, in each of the three pixel circuits 60, the switching TFTs 62, 63, and 66 are in a non-conducting state and the switching TFTs 64 and 65 are in a conducting state. At this time, since the driving TFT 61 is in a conducting state, a current flows to the organic EL element 67 from the power supply wiring line Vp through the driving TFT 61 and the switching TFT 64, and thus, the organic EL element 67 emits light. As such, before time t0, the organic EL elements 67 in the three pixel circuits 60 are all in a light-emitting state.

When at time t0 the potential of the control line Ei is changed to a high level, in each of the three pixel circuits 60, the switching TFTs 64 and 65 change to a non-conducting state. Hence, the current flowing through the organic EL element 67 from the power supply wiring line Vp is interrupted, and thus, the organic EL element 67 stops emitting light.

Then, when at time t1 the potentials of the scanning lines GAi and GBi are changed to a low level, in each of the three pixel circuit 60, the switching TFTs 62, 63, and 66 change to a conducting state. Hence, the node D is connected to a corresponding precharge line through the switching TFTs 63 and 66, and the node E is connected to a corresponding data line Sj through the switching TFT 62. While the potential of the scanning line GAi is at a low level, data voltages Vd_R, Vd_G, and Vd_B outputted from the latch 17 are applied to the data lines Sk_R, Sk_G, and Sk_B, respectively. Therefore, in the R pixel circuit 60*r*, the potential at the node D reaches Vint_R and the potential at the node E reaches Vd_R. Likewise, in the G pixel circuit 60*g*, the potential at the node D reaches Vint_G and the potential at the node E reaches Vd_G. In the B pixel circuit 60*b*, the potential at the node D reaches Vint_B and the potential at the node E reaches Vd_B.

Then, when at time t2 the potential of the scanning line GBi is changed to a high level, in each of the three pixel circuits 60, the switching TFT 66 changes to a non-conducting state. After time t2, a current flows into the gate terminal of the driving TFT 61 from the power supply wiring line Vp through the driving TFT 61 and the switching TFT 63, and thus, the potential at the node D rises while the driving TFT 61 is in a conducting state.

Then, when at time t3 the potential of the scanning line GAi is changed to a high level, in each of the three pixel circuits 60, the switching TFTs 62 and 63 change to a non-conducting state. The potentials at the nodes D in the R pixel circuit 60*r*, the G pixel circuit 60*g*, and the B pixel circuit 60*b* immediately before time t3 are assumed to be (VDD+Vx_R), (VDD+Vx_G), and (VDD+Vx_B), respectively. Note that the voltages Vx_R, Vx_G, and Vx_B have negative values and are assumed to satisfy the following: $|Vx\_R|>|Vth\_R|$, $|Vx\_G|>|Vth\_G|$, and $|Vx\_B|>|Vth\_B|$.

When at time t3 the switching TFTs 62 and 63 are changed to a non-conducting state, a voltage (VDD+Vx_R−Vd_R) is held in the capacitor 68 in the R pixel circuit 60*r*. Likewise, a voltage (VDD+Vx_G−Vd_G) is held in the capacitor 68 in the G pixel circuit 60*g*, and a voltage (VDD+Vx_B−Vd_B) is held in the capacitor 68 in the B pixel circuit 60*b*.

As described above, the potential at the node D in the R pixel circuit 60*r* rises while the driving TFT 61 is in a conducting state. Thus, if there is sufficient time, then the potential at the node D in the R pixel circuit 60*r* rises until the gate-source voltage of the driving TFT 61 reaches the threshold voltage Vth_R (negative value) (the driving TFT 61 is placed in a threshold state), and reaches (VDD+Vth_R) in the end. However, in the display device 50, time t3 comes while the driving TFT 61 is in a conducting state. Thus, the potential (VDD+Vx_R) at the node D immediately before time t3 is lower than (VDD+Vth_R). The voltage Vx_R changes according to the threshold voltage Vth_R, and the larger the absolute value of the threshold voltage Vth_R, the larger the absolute value of the voltage Vx_R. Likewise, the potential (VDD+Vx_G) at the node D in the G pixel circuit 60*g* immediately before time t3 is lower than (VDD+Vth_G), and the larger the absolute value of the threshold voltage Vth_G, the larger the absolute value of the voltage Vx_G. In addition, the potential (VDD+Vx_B) at the node D in the B pixel circuit 60*b* immediately before time t3 is lower than (VDD+Vth_B), and the larger the absolute value of the threshold voltage Vth_B, the larger the absolute value of the voltage Vx_B.

Then, when at time t4 the potential of the control line Ei is changed to a low level, in each of the three pixel circuits 60, the switching TFTs 64 and 65 change to a conducting state. In the R pixel circuit 60*r*, while the capacitor 68 holds the voltage (VDD+Vx_R−Vd_R), the potential at the node E changes from Vd_R to Vint_R. Therefore, the potential at the node D also changes by the same amount (Vint_R−Vd_R) and reaches (VDD+Vx_R)+(Vint_R−Vd_R)=(VDD+Vx_R+Vint_R−Vd_R). Likewise, the potential at the node D in the G pixel circuit 60*g* reaches (VDD+Vx_G+Vint_G−Vd_G), and the potential at the node D in the B pixel circuit 60*b* reaches (VDD+Vx_B+Vint_B−Vd_B).

After time t4, the voltages held in the capacitors 68 in the three pixel circuits 60 do not change. Hence, the potential at the node D in the R pixel circuit 60*r* remains at (VDD+Vx_R+Vint_R−Vd_R). Likewise, the potential at the node D in the G pixel circuit 60*g* remains at (VDD+Vx_G+Vint_G−Vd_G), and the potential at the node D in the B pixel circuit 60*b* remains at (VDD+Vx_B+Vint_B−Vd_B). Therefore, in each of the three pixel circuits 60, during a period after time t4 and before the potential of the control line Ei changes to a high level next time, a current flows to the organic EL element 67 from the power supply wiring line Vp through the driving TFT 61 and the switching TFT 64, and thus, the organic EL element 67 emits light. The amount of current flowing through the driving TFT 61 at this time increases and decreases according to the potential at the node D; however, as shown in the following, even if the threshold voltage of the driving TFT 61 is different, if the data voltage is the same, then the amount of current can be made to be the same.

As an example, the R pixel circuit 60*r* will be described. In the R pixel circuit 60*r*, when the organic EL element 67 emits light, the gate terminal potential Vg of the driving TFT 61 reaches (VDD+Vx_R+Vint_R−Vd_R). Therefore, by equation (1), a current $I_{EL}$ flowing between the drain and source of the driving TFT 61 is as shown in the following equation (6).

$$I_{EL}=-\tfrac{1}{2}\cdot W/L\cdot Cox\cdot\mu\cdot\{Vint\_R-Vd\_R+(Vx\_R-Vth\_R)\}^2 \tag{6}$$

In equation (6), if the voltage Vx_R coincides with the threshold voltage Vth_R, then the current $I_{EL}$ does not depend on the threshold voltage Vth_R. Also, even if the voltage Vx_R does not coincide with the threshold voltage Vth_R, if the difference therebetween is constant, then the current $I_{EL}$ does not depend on the threshold voltage Vth_R.

In the display device 50, as in the first embodiment, the length of a threshold correction period and the level of the initial voltage Vint_R are determined such that the difference in voltage Vx_R is substantially the same as the difference in threshold voltage Vth_R between two TFTs in the R pixel circuit. Hence, the voltage difference (Vx_R−Vth_R) included in equation (6) is substantially constant. Therefore, in the R pixel circuit 60*r*, regardless of the value of the threshold voltage Vth_R, a current of an amount according to the data voltage Vd_R flows through the organic EL element 67, and thus, the organic EL element 67 emits light at a luminance according to the data voltage Vd_R.

Likewise, in the G pixel circuit 60*g*, regardless of the value of the threshold voltage Vth_G, a current of an amount according to the data voltage Vd_G flows through the organic EL element 67, and thus, the organic EL element 67 emits light at a luminance according to the data voltage Vd_G. In addition, in the B pixel circuit 60*b*, regardless of the value of the threshold voltage Vth_B, a current of an amount according to the data voltage Vd_B flows through the organic EL element 67, and thus, the organic EL element 67 emits light at a luminance according to the data voltage Vd_B. In the display device 50, although the configuration of the pixel circuits 60 are more complex than that in the display device 10 according to the first embodiment, the configuration of the source driver circuit 53 is simplified.

In the display device 50, at least two of the initial voltages Vint_R, Vint_G, and Vint_B are set to differ from each other. Specifically, it is desirable that the initial voltage Vint_G for G pixel circuits differ from the initial voltage Vint_B for B pixel circuits, and $|Vgs0\_G|<|Vgs0\_B|$ be satisfied. It is more desirable that the initial voltages Vint_R, Vint_G, and Vint_B all differ from one another, and $|Vgs0\_G|<|Vgs0\_R|<|Vgs0\_B|$ be satisfied. All of the initial voltages Vint_R, Vint_G, and Vint_B are set to a level lower than the supply voltage VDD.

Figure 16:
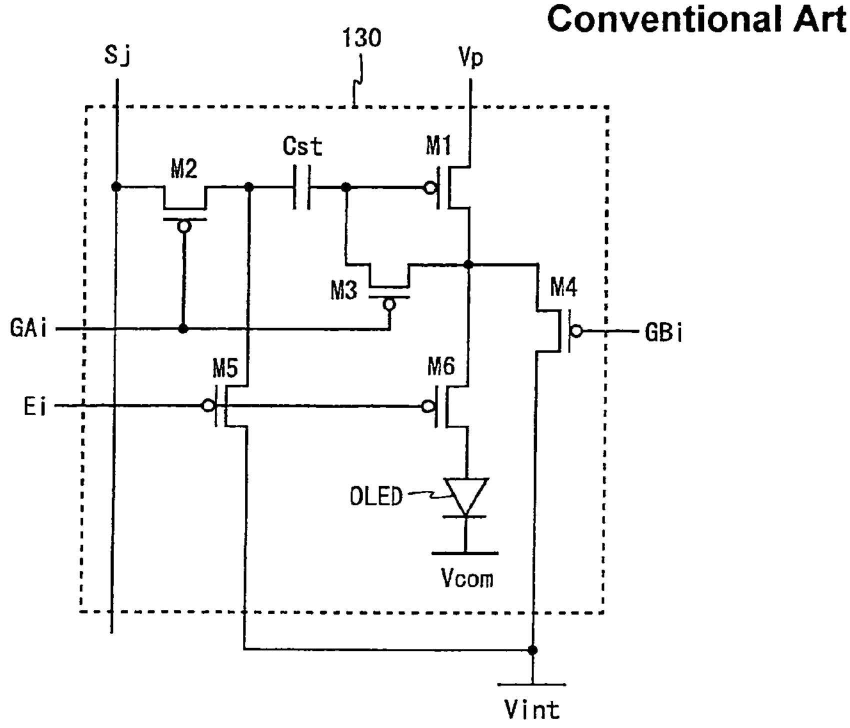
Fig. 16 Conventional Art
FIG. 16 is a circuit diagram of a pixel circuit included in a conventional display device (second example).
Figure 17:
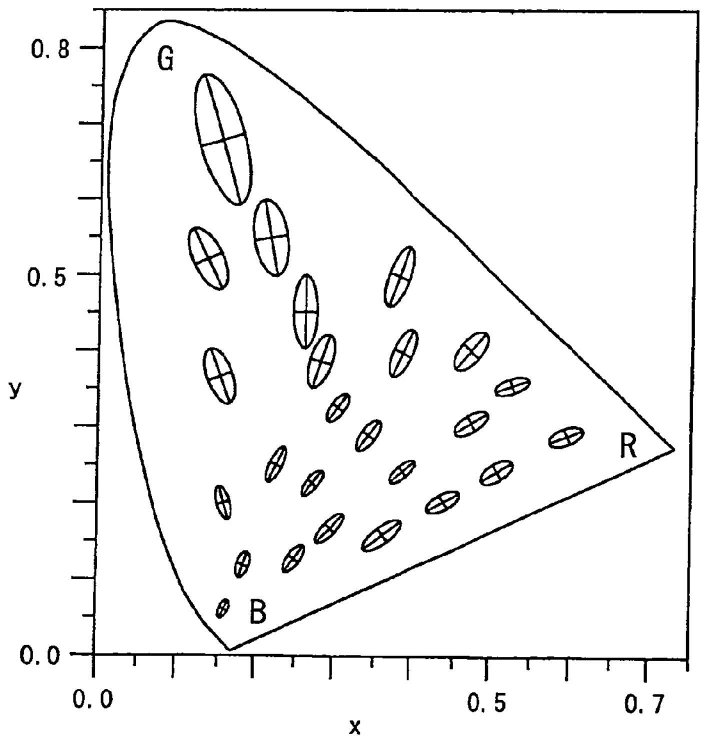
Fig. 17 Conventional Art
FIG. 17 is a diagram showing MacAdam's chromatic discrimination thresholds.

The display device 50 according to the present embodiment provides the same effects as the display device 10 according to the first embodiment. In a conventional display device including pixel circuits 130 shown in FIG. 16, one type of initial voltage Vint is used in the entire device. Hence, the conventional display device has problems that determining the initial voltage Vint with reference to green degrades image quality and determining the initial voltage Vint with reference to blue increases power consumption.

On the other hand, in the display device 50 according to the present embodiment, a plurality of initial voltages Vint_R, Vint_G, and Vint_B are used, and at least two of them differ from each other. Hence, for example, such an initial voltage Vint_B that increases $|Vgs0|$ can be used for B pixel circuits, and such an initial voltage Vint_G that reduces $|Vgs0|$ can be used for G pixel circuits. By this, for blue for which the human is sensitive to chromaticity differences, a large initial potential difference is provided between the gate and source terminals of a driving TFT 61, whereby threshold correction is performed with high accuracy, enabling to improve image quality. On the other hand, for green for which the human is insensitive to chromaticity differences, a small initial potential difference is provided between the gate and source terminals of a driving TFT 61, whereby excessive charging and discharging of signal lines are reduced, enabling to reduce power consumption. In addition, by using such initial voltages Vint_R, Vint_G, and Vint_B that satisfy $|Vgs0\_G|<|Vgs0\_R|<|Vgs0\_B|$, the above-described effects can be further increased.

As such, according to the display device 50 according to the present embodiment, by using the initial voltage Vint_R, Vint_G, or Vint_B according to the display color, when threshold correction of a driving TFT 61 is performed, an initial potential difference provided between the gate and source terminals of the driving TFT 61 is switched according to the display color, taking into account human visual characteristics. Thus, image quality can be improved and power consumption can be reduced.

Note that in the present embodiment, too, as in the first embodiment, a variant in which three types of pixel circuits are connected to different power supply wiring lines can be formed. In a display device according to the variant, a supply voltage VDD_R is applied to power supply wiring lines connected to R pixel circuits 60*r*, a supply voltage VDD_G is applied to power supply wiring lines connected to G pixel circuits 60*g*, and a supply voltage VDD_B is applied to power supply wiring lines connected to B pixel circuits 60*b*.

As described above, according to display devices of the present invention, when color display is performed with threshold correction of a drive element, by providing an initial potential difference according to the display color between the control terminal and second conduction terminal of the drive element, image quality can be improved and power consumption can be reduced.

INDUSTRIAL APPLICABILITY

Display devices of the present invention have features such as high image quality and low power consumption, and thus, can be used as display devices of various types of electronic equipment.

DESCRIPTION OF REFERENCE NUMERALS

| | |
|---|---|
| 10, 40, and 50: | DISPLAY DEVICE |
| 11 and 51: | DISPLAY CONTROL CIRCUIT |
| 12 and 52: | GATE DRIVER CIRCUIT |
| 13, 43, and 53: | SOURCE DRIVER CIRCUIT |
| 14, 44, and 54: | POWER SUPPLY |
| 15: | SHIFT REGISTER |
| 16: | REGISTER |
| 17: | LATCH |
| 20 and 60: | PIXEL CIRCUIT |
| 21 and 61: | DRIVING TFT |
| 22 to 24 and 62 to 66: | SWITCHING TFT |
| 25 and 67: | ORGANIC EL ELEMENT |
| 26, 37, and 68: | CAPACITOR |
| 30 and 45: | OUTPUT CIRCUIT |
| 31 to 36: | SWITCH |
| 38 and 55: | ANALOG BUFFER |

The invention claimed is:

1. A current-driven type display device that performs color display comprising: a plurality of pixel circuits arranged at respective intersections of a plurality of scanning lines and a plurality of data lines; and a gate and source drive circuits that select, from the plurality of pixel circuits, a selected pixel circuit using a corresponding scanning line, and write a corrected data voltage into the selected pixel circuit using a corresponding data line, wherein each pixel circuit is one of a plurality of different color pixel circuits including a red pixel circuit, a green pixel circuit and a blue pixel circuit, and includes an electro-optic element; a drive element having a control terminal, a first conduction terminal and a second conduction terminal to which a supply voltage is applied, and controlling an amount of current flowing through the electro-optic element according to a potential difference between the control terminal and the second conduction terminal; a first capacitor provided between the control terminal and the second conduction terminal of the drive element; a writing switching element provided between the control terminal of the drive element and the corresponding data line; and a compensation switching element provided between the control terminal and the first conduction terminal of the drive element, wherein the gate drive circuit is configured to set an initialization period within a selection period of the pixel circuit, set a threshold correction period within the selection period after the initialization period, and set a write period within the selection period after the threshold correction period; control the writing switching element to a conducting state during the selection period, and control the writing switching element to a non-conducting state outside the selection period; control the compensation switching element to the conducting state during the initialization period; control the compensation switching element to the conducting state during the threshold correction period; and control the compensation switching element to the non-conducting state during the writing period, wherein the source drive circuit includes a second capacitor corresponding to each of the plurality of data lines, and is configured to apply a first initial voltage to the control terminal of the drive element during the initialization period to set an initial potential difference between the control terminal and the second conduction terminal of the drive element to a difference between the supply voltage and the first initial voltage by applying the first initial voltage to the corresponding data line, the first initial voltage being selected from among a plurality of different initial voltages based on a color of the pixel circuit; make a correction current flow through the compensation switching element during the threshold correction period by applying no voltages to the corresponding data line, and store a voltage of the corresponding data line to the second capacitor at the end of the threshold correction period; and apply the corrected data voltage to the control terminal of the drive element during the writing period by applying a data voltage corrected using the voltage stored in the second capacitor, and wherein the plurality of the initial voltages are set such that the correction current flowing through the compensation switching element during the threshold correction period is smallest in the pixel circuit for green among the three types of pixel circuits.

2. The display device according to claim 1, wherein the plurality of the initial voltages are set such that the correction current flowing through the compensation switching element during the threshold correction period is largest in the pixel circuit for blue among the three types of pixel circuits.

3. The display device according to claim 1, wherein the source drive circuit is further configured to connect a first electrode of the second capacitor to the corresponding data line during the threshold correction period and the writing period; apply a reference voltage to a second electrode of the second capacitor during the threshold correction period; and apply a data voltage before correction to the second electrode of the second capacitor during the writing period.

4. The display device according to claim 3, wherein the reference voltage is selected from among a plurality of different reference voltages based on the color of the pixel circuit.

* * * * *